US008665777B2

(12) United States Patent  
Marshack et al.

(10) Patent No.: US 8,665,777 B2  
(45) Date of Patent: Mar. 4, 2014

(54) DYNAMIC ROUTING FROM SPACE

(75) Inventors: David Marshack, Bethesda, MD (US); Stewart Nozette, Chevy Chase, MD (US); Andrew Fellows, Vienna, VA (US); Geoffrey Tudor, Austin, TX (US); Amy Mehlman, Potomac, MD (US)

(73) Assignee: DNA Global Solutions, Vienna, VA (US)

( * ) Notice: Subject to any disclaimer, the term of this patent is extended or adjusted under 35 U.S.C. 154(b) by 1237 days.

(21) Appl. No.: 11/969,720

(22) Filed: Jan. 4, 2008

(65) Prior Publication Data

US 2008/0170536 A1 Jul. 17, 2008

Related U.S. Application Data

(60) Provisional application No. 60/884,810, filed on Jan. 12, 2007.

(51) Int. Cl.
*H04B 7/185* (2006.01)
*H04B 7/212* (2006.01)
*G01R 31/08* (2006.01)

(52) U.S. Cl.
USPC .............................. 370/316; 370/261; 370/323

(58) Field of Classification Search
USPC .......................................................... 370/318
See application file for complete search history.

(56) References Cited

U.S. PATENT DOCUMENTS

| 5,365,520 | A | 11/1994 | Wang | |
| 5,987,011 | A * | 11/1999 | Toh | 370/331 |
| 6,067,452 | A | 5/2000 | Alexander | |
| 6,157,624 | A * | 12/2000 | Zancho | 370/316 |
| 6,178,163 | B1 * | 1/2001 | Yuan et al. | 370/323 |
| 6,404,769 | B1 | 6/2002 | Kapoor | |
| 6,609,002 | B1 * | 8/2003 | Krishnamurthy et al. | 455/428 |
| 6,653,945 | B2 * | 11/2003 | Johnson et al. | 340/870.02 |
| 6,678,520 | B1 | 1/2004 | Wang | 455/428 |
| 6,985,454 | B1 | 1/2006 | Wiedeman | 370/316 |
| 7,095,980 | B2 | 8/2006 | Toya | 455/13.1 |
| 7,136,620 | B2 | 11/2006 | Wang | 455/131 |
| 7,181,206 | B2 | 2/2007 | Pedersen | 455/425 |
| 2002/0122408 | A1 | 9/2002 | Mullins | |
| 2003/0055975 | A1 | 3/2003 | Nelson | |
| 2003/0137930 | A1 * | 7/2003 | Futernik | 370/216 |
| 2004/0157554 | A1 | 8/2004 | Wesel | 455/12.1 |
| 2005/0053026 | A1 | 3/2005 | Mullan | 370/316 |

OTHER PUBLICATIONS

International Search Report dated May 16, 2008 in Int'l Pat. App. No. PCT/US08/50405.

* cited by examiner

*Primary Examiner* — Afshawn Towfighi
(74) *Attorney, Agent, or Firm* — Fish & Richardson P.C.

(57) ABSTRACT

A satellite communication network includes one or more satellites and multiple ground stations, or ground stations. An originating ground station receives an Internet communication, determines when a satellite will be within range, and transmits a stream of data packets including part or all of the communication to the satellite when in communication range. The satellite either forwards the data packets to another satellite, or determines when a destination ground station will be in sight and transmits the data packets to the destination ground station when in range.

21 Claims, 18 Drawing Sheets

DYNAMIC ROUTING FROM SPACE

CROSS-REFERENCE TO RELATED APPLICATION

This application claims the benefit of U.S. Provisional Patent Application No. 60/884,810, filed Jan. 12, 2007, which is incorporated herein by reference for all purposes.

FIELD

This application generally relates to communication networks, and at least one particular implementation relates to a network of Low Earth Orbit ("LEO") or Medium Earth Orbit ("MEO") satellites which provides communication via the Internet Protocol ("IP").

BACKGROUND

While specific definitions of LEO vary between sources, LEO is generally considered to include any orbital path having a locus within about 2,000 kilometers (km) of the Earth's surface. A typical LEO satellite, for example, follows a circular orbital path between about 200 km and about 1,000 km above the Earth's surface. Many LEO satellites travel at about 27,400 km/h (8 km/s) and complete an orbit, or revolution, around the Earth approximately every 90 minutes. To its advantage, less energy is required to propel a satellite from the Earth's surface onto LEO than onto a higher orbit, and LEO communication satellites require less powerful amplifiers for successful transmission of data to the Earth's surface. As a consequence, the lower radiation levels associated with LEO communication satellites permit the use of less robust, and thus less costly, satellite components.

Medium-earth-orbit (MEO), which is sometimes also referred to as an intermediate circular orbit (ICO), is generally considered to include any orbital path having a locus further from the Earth's surface than LEO and less distant than geostationary orbit (GEO) levels. For reference, GEO satellites typically travel at an altitude of about 35,786 km above the Earth's surface and have an orbital period equal to one sidereal day.

SUMMARY

According to one general implementation, a computer-implemented process includes receiving, at an origin mobile ground station, data via a network, determining, at the origin mobile ground station, a predicted location of the origin mobile ground station based on a current position, heading and velocity of the origin mobile ground station, and dynamically selecting, at the origin mobile ground station, a first satellite within communication range of the predicted location. The process also includes determining, at the origin mobile ground station, a first radio frequency and a first data transmission rate supported by the first satellite, transmitting, when the origin mobile ground station reaches the predicted location, the data from the origin mobile ground station to the first satellite via the determined first radio frequency and first data transmission rate, and determining, at the origin mobile ground station, when the first satellite will go out of communication range of the origin mobile ground station. Moreover, the process includes transmitting a request from the origin mobile ground station to the first satellite before the first satellite is determined to go out of communication range, the request verifying whether transmitting of the data has been completed, and transmitting, if a response to the request is received verifying that transmitting of the data has not been completed or if no response to the request is received, a flag from the origin mobile ground station to the first satellite, the flag indicating that the data is incomplete.

Implementations may include one or more of the following features. For instance, the process may further include determining, at the first satellite, a first geographical footprint based on a communication capability of the first satellite, the first geographical footprint including the predicted location, determining, at the first satellite, the radio frequency based on the first geographical footprint, monitoring, at the first satellite, the radio frequency, receiving, at the first satellite, the data via the radio frequency, determining, at the first satellite, a destination ground station based on header information included with the data, dynamically selecting, at the first satellite, a second satellite that is or is predicted to be physically closer to the destination ground station than the first satellite, determining, at the first satellite, a transmission medium supported by the first satellite and the second satellite, and transmitting the data from the first satellite to the second satellite via the transmission medium, when the second satellite is expected to be within communication range of the first satellite. Furthermore, the process may include determining, at the second satellite, the destination ground station based on the header information, determining, at the second satellite, when the destination ground station will be within communication range of the second satellite, transmitting the data from the second satellite to the first satellite when the destination ground station is determined to be within communication range of the second satellite, and erasing, at the second satellite, the data.

In additional examples, the process may include determining, at the first satellite, a destination ground station based on header information included with the data, determining, at the first satellite, that the destination ground station is within a first geographical footprint of the first satellite based on a communication capability of the first satellite, determining, at the first satellite, a second radio frequency and a second data transmission rate supported by the destination ground station, and transmitting, when it is determined that the first satellite and the destination ground station are within the first geographical footprint, the data from the first satellite to the destination ground station. The first satellite may be a low earth orbit (LEO) satellite, and may be dynamically selected further based on Internet Protocol (IP) routing and/or ephemeris information of the first satellite. The network may be an Internet network.

In further examples, if a response to the request is received verifying that transmitting of the data has not been completed or if no response to the request is received, the process includes determining, at the origin mobile ground station, a second predicted location of the origin mobile ground station, dynamically selecting, at the origin mobile ground station, a second satellite within communication range of the second predicted location, determining, at the origin mobile ground station, a second radio frequency and a second data transmission rate supported by the second satellite, transmitting, when the origin mobile ground station reaches the second predicted location, at least a portion of the data from the origin mobile ground station to the second satellite via the determined second radio frequency and second data transmission rate, determining, at the origin mobile ground station, when the second satellite will go out of communication range of the origin mobile ground station, transmitting a second request from the origin mobile ground station to the second satellite before second satellite is determined to go out of communication range, the request verifying whether transmitting of the at least the portion of the data has been completed, and transmitting, if a second response to the second request is received verifying that transmitting of the at least the portion of the data has not been completed or if no response to the second request is received, a second flag from the origin mobile ground station to the second satellite, the flag indicating that the data is incomplete. The data may be transmitted from the first satellite to a destination ground station without transmitting the data to a second satellite.

In other examples, the process may include receiving a first portion of the data at the first satellite before the first satellite goes out of communication range of the origin mobile ground station, receiving a second portion of the data at the first satellite after the first satellite goes out of communication range and re-enters the communication range of the origin mobile ground station, combining, at the first satellite, the first and second portions of the data, and transmitting the combined first and second portions of the data to a destination ground station. The process also may include receiving, at the satellite, a duplicate copy of the first or second portions of the data, determining that the duplicate copy is a duplicate of the received first or second portions of the data, and erasing the duplicate copy. The date may be a stream of Internet Protocol (IP) packets.

In further examples, the process may include transmitting the data from the first satellite to a second satellite based on determining, at the first satellite, that the second satellite is closer to a destination ground station than the first satellite based on ephemeris information of the first and second satellites, transmitting the data from the second satellite to a third satellite based on determining, at the second satellite, that the third satellite is closer to the destination ground station than the second satellite based on ephemeris information of the second and third satellites, transmitting the data from the third satellite to a fourth satellite based on determining, at the third satellite, that the fourth satellite is closer to the destination ground station than the third satellite based on ephemeris information of the third and fourth satellites, and transmitting the data from the fourth satellite to the destination ground station. An indicia of the predicted location may be transmitted to from the origin mobile ground station to the first satellite.

Also, processes may include accessing ephemeris data calculated by an on-board astrodynamics calculator and received from other available network satellites, accessing an on-board Internet routing table describing distance or cost information of the other available network satellites, and determining whether to forward the data to one of the other available network satellites based on the accessed ephemeris data and the on-board Internet routing table. The process may also include accessing availability data describing current and future availability of other network satellites, accessing ephemeris data calculated by an on-board astrodynamics calculator and received from the other available network satellites, accessing an on-board Internet routing table describing distance or cost information of the other available network satellites, accessing a list of currently available ground stations that are not a destination ground station, and determining whether to route the data to an other available network satellite or to an available ground station on the list of currently available ground stations based on the availability data, the ephemeris data, and the on-board Internet routing table.

In another general implementation, a device includes an interface, a processor, and a transmitter. The interface is configured to receive data via a network. The processor is configured to determine a predicted location of an origin mobile ground station based on a current position, heading and velocity of the origin mobile ground station, to dynamically select a first satellite within communication range of the predicted location, to determine a first radio frequency and a first data transmission rate supported by the first satellite, and to determine when the first satellite will go out of communication range of the origin mobile ground station. The transmitter is configured to transmit, when the origin mobile ground station reaches the predicted location, the data to the first satellite via the determined first radio frequency and first data transmission rate, to transmit a request to the first satellite before the first satellite is determined to go out of communication range, the request verifying whether transmitting of the data has been completed, and to transmit, if a response to the request is received verifying that transmitting of the data has not been completed or if no response to the request is received, a flag to the first satellite, the flag indicating that the data is incomplete.

According to another general implementation, a computer program product is tangibly embodied in a machine-readable medium. The computer program product includes instructions that, when read by a machine, operate to cause data processing apparatus to receive data via a network, to determine a predicted location of an origin mobile ground station based on a current position, heading and velocity of the origin mobile ground station, to dynamically select a first satellite within communication range of the predicted location, to determine a first radio frequency and a first data transmission rate supported by the first satellite, to transmit, when the origin mobile ground station reaches the predicted location, the data to the first satellite via the determined first radio frequency and first data transmission rate, to determine when the first satellite will go out of communication range of the origin mobile ground station, to transmit a request to the first satellite before the first satellite is determined to go out of communication range, the request verifying whether transmitting of the data has been completed, and transmit, if a response to the request is received verifying that transmitting of the data has not been completed or if no response to the request is received, a flag to the first satellite, the flag indicating that the data is incomplete.

According to a further general implementation, a computer-implemented process for effecting broadband Internet access from space using a single satellite includes routing Internet data from an origin ground station to a satellite based on predicting that the satellite is within communication range of the origin ground station, storing the Internet data on the satellite until the satellite travels within predicted communication range of the destination ground station, and routing the Internet data to the destination ground station when the satellite is within the predicted communication range.

This brief summary has been provided to enable a quick understanding of various concepts and implementations described by this document. A more complete understanding may be obtained by reference to the following detailed description in connection with the attached drawings. It is to be understood that other implementations may be utilized and changes may be made.

DESCRIPTION OF DRAWINGS

Like reference numbers represent correspond parts throughout.

DETAILED DESCRIPTION

According to one general implementation, a LEO or MEO satellite communication network is provided which uses the IP to receive and forward packet-switched communications. Internet communications are received at earthbound ground stations by way of standard Internet routing and are transmitted to network satellites. The network satellites carry onboard Internet routers, and use Internet routing algorithms to forward the communications to other network satellites and to other ground stations.

The network satellites also incorporate onboard global positioning system (GPS) receivers, and the ground stations and network satellites share and utilize GPS data and other ephemeris information to make routing determinations, as well as to intelligently anticipate reception and transmission times to other network satellites and ground stations. In addition, the network satellites use the combination of GPS data and ephemeris information to select transmission frequencies for satellite-to-ground station communications based on the temporal locations of the satellites and target ground stations.

Figure 1:
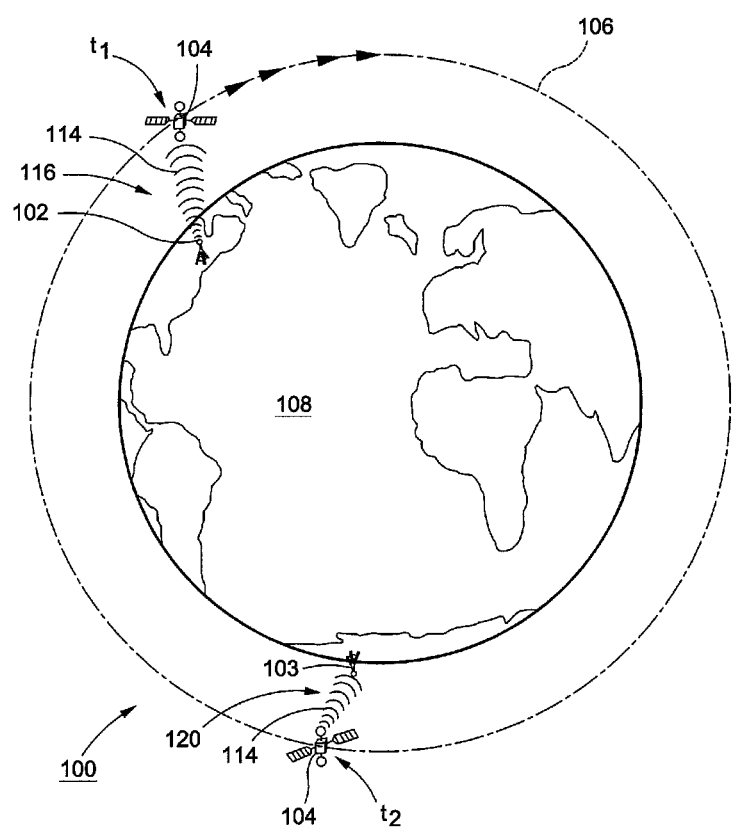
FIG. 1 depicts an exemplary LEO/MEO satellite communication network having a single network satellite.
Figure 2:
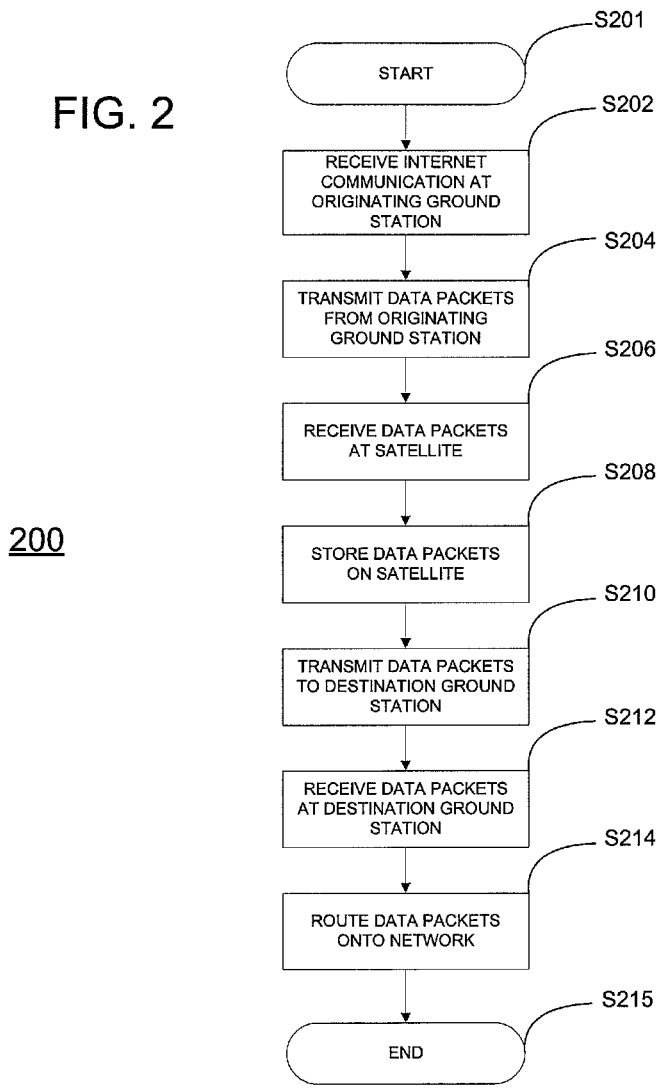
FIG. 2 is a flowchart depicting a exemplary process for ground station-to-satellite-to-ground station packet-switched communication performed by the satellite network of FIG. 1.

Referring to the drawings, FIG. 1 depicts an exemplary LEO/MEO satellite communication network 100 having two network ground stations 102 and 103, and a single network satellite 104 in a LEO or MEO orbit 106 around the Earth 108. FIG. 2 depicts a corresponding exemplary ground station-to-satellite-to-ground station packet-switched communication process 200 that may be performed by the network 100.

When process 200 begins (S201), the originating ground station 102 receives an Internet communication from an earthbound network, the Internet communication bound for an Internet destination address associated with the destination ground station 103 (S202). As the satellite 104 passes over the originating ground station 102 at time $t_1$, the originating ground station 102 transmits a stream of IP data packets 114 including the received Internet communication via a radio-frequency (RF) signal 116 to the satellite 104 (S204).

The satellite 104 receives the data packets 114 (S206), and stores the data packets (S208). The satellite 104 continues to travel along its orbital path 106, until it comes within communication range of the destination ground station 103 at time $t_2$. When within communication range, the satellite 104 transmits the stream of data packets 114 via an RF signal 120 to the destination ground station 103 (S210).

The term "radio-frequency," or "RF," includes signals, including low-, medium-, high-, very high-, and ultra high-frequency signals, long wave, amplitude modulation (AM), shortwave, and frequency modulation (FM) radio signals, as well as super high-frequency and extremely high-frequency signals, such as microwave signals. Thus, in providing communication between ground stations and/or satellites, any combination of RF signals, including microwave-frequency signals, as well as any other suitable carrier signals, may be used to convey ground station-to-satellite and satellite-to-ground station communications. Additionally, any combination of RF and optical signals, as well as any other suitable carrier signals, may be used to effectuate satellite-to-satellite communications. Generally, however, inter-satellite links in the network include optical signals within each orbital plane, or ring, facilitating improved link capacity within individual LEO/MEO rings, and RF signals between rings. Allowing the satellites to intercommunicate also reduces the required number of ground stations.

The destination ground station 103 receives the data packets 114 (S212), and routes the data packets via another earthbound network (S214), thereby ending process 200 (S215). Thus, packet-switched communications may originate from or be routed via any ground station within communication range of the network satellite 104 in the orbital path 106. Furthermore, as was made clear in the above example, the enhanced satellite network may one satellite operating independently, or many satellites working together or each operating independently.

The terms "earthbound network" and "land-based network" include wireless networks that are generally used for communications on or near the surface of the Earth. For example, an earthbound network may include wireline or wireless local area network (WLAN), such as a Wi-Fi hotspot for mobile computing devices, based on the IEEE® 802.11 specifications, or the Internet. As another exemplary, a land-based network may include a wireless personal area network (PAN), such as a wireless network based on the Bluetooth specification.

In a further implementation, the originating ground station 102 transmits a stream of data packets 114 including a portion of the received Internet communication during a first pass of the satellite 104, and transmits another stream of data packets including another portion of the communication during another pass of the satellite 104. For example, if the received communication is too large to be fully transmitted at a data transmission rate supported by the satellite 104 during the time which the satellite 104 is within communication range of the ground station 102 on a first pass, the originating ground station 102 stores the remaining portion of the communication and transmits it to the satellite 104 after the satellite 104 again comes within communication range of the originating ground station 102. For example, the originating ground station 102 may transmit the remaining portion of the communication to the satellite 104, when the satellite 104 completes an additional orbit around the Earth 108.

Similarly, the satellite 104 transmits the stream of data packets 114 to the destination ground station 103 on a first pass over the destination ground station 103 after receiving the data packets 114, and later transmits the remaining stream of data packets during a subsequent pass over the ground station 103. In this manner, the received communication is uploaded to the satellite 104 and downloaded to the destination ground station 103 in segments during any number of consecutive or nonconsecutive passes of the satellite 104 over the ground stations 102 and 103. If more than one portion of the communications are stored on the satellite 104, one or more portions may be downloaded to the destination ground station 103 when the destination ground station 103 comes within communication range, as determined by the communication capabilities of the satellite 104 and the destination ground station 103.

Figure 3:
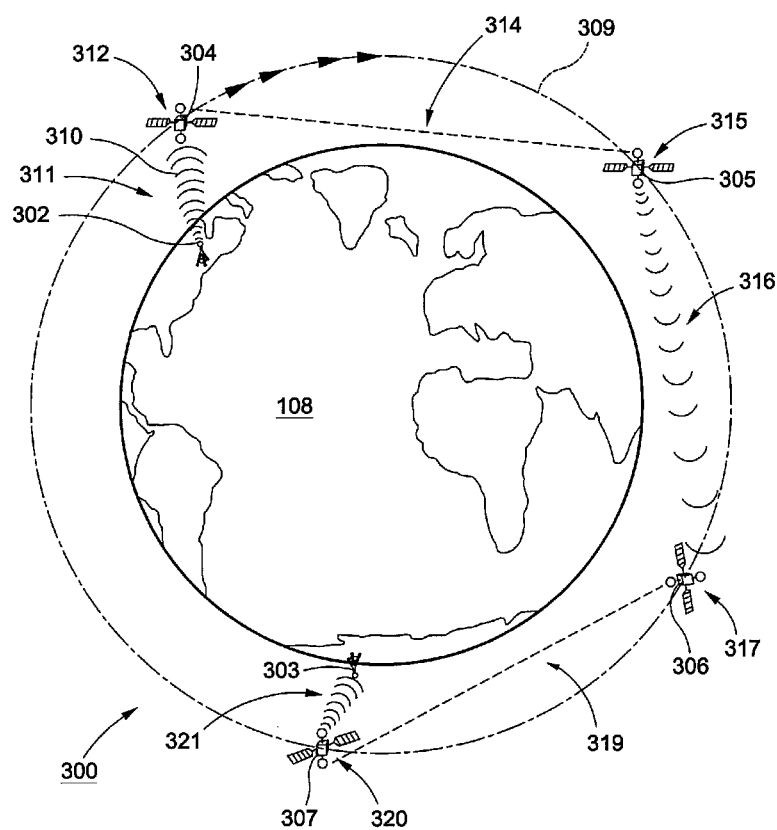
FIG. 3 depicts another exemplary LEO/MEO satellite communication network having at least four satellites.
Figure 4:
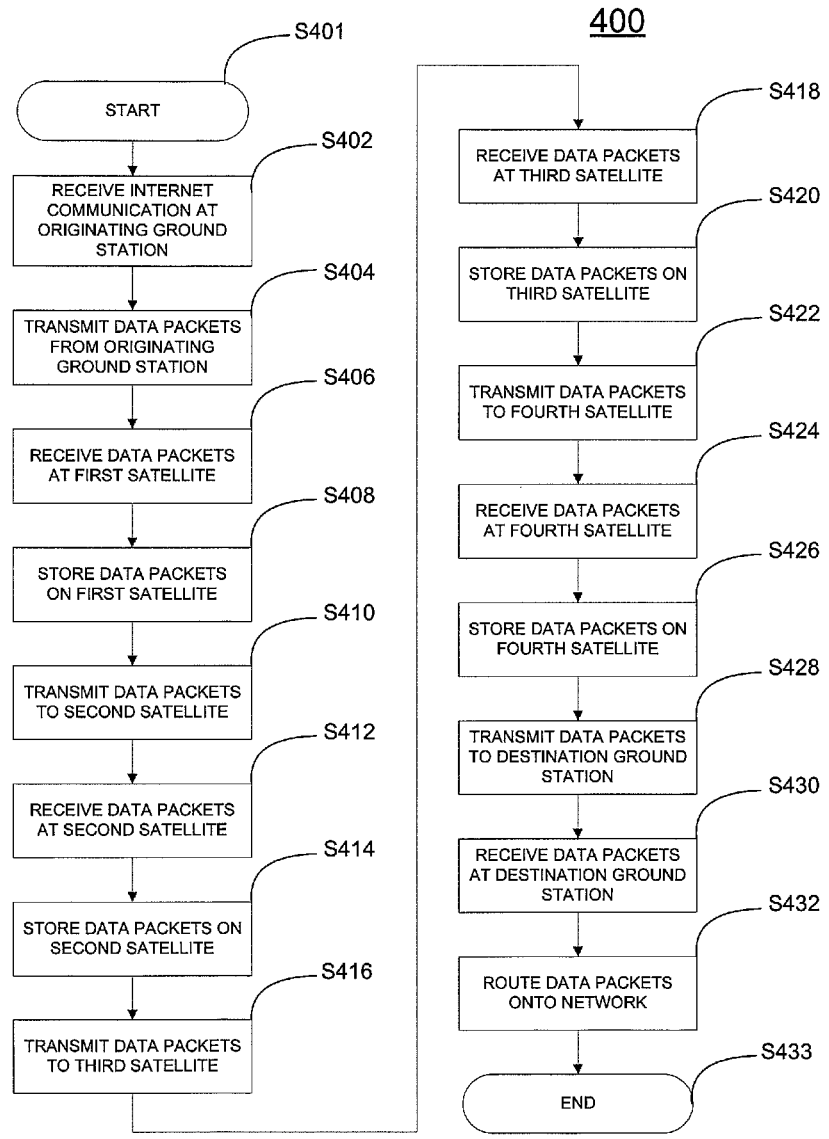
FIG. 4 is a flowchart depicting an exemplary process for ground station-to-satellite-to-satellite-to-ground station packet-switched communication performed by the satellite network of FIG. 3.

FIG. 3 depicts another satellite communication network 300 having two network ground stations 302 and 303 and four network satellites 304 to 307 at different points in a LEO/MEO orbital path 309 around the Earth 108. Correspondingly, FIG. 4 depicts an exemplary ground station-to-satellite-to-satellite-to-ground station packet-switched communication process 400 that may be performed by the network 300.

When process 400 begins (S401), the originating ground station 302 receives an Internet communication from an earthbound network bound for an Internet destination address that is associated with the destination ground station 303 (S402). When the first satellite 304 comes within communication range of the originating ground station 302, the ground station 302 transmits a stream of IP data packets 310 including the received Internet communication over the RF signal 311 to the first satellite 304, disposed at a location 312 within orbital path 309 (S404). The first satellite 304 receives the data packets 310 (S406), stores the data packets 310 (S408), and transmits the data packets 310 over an optical signal 314 to the second satellite 305, that is within optical communication range of the first satellite 304 and is disposed at a location 315 within orbital path 309 between the first satellite 304 and the destination ground station 303 (S410). The second satellite 305 receives the data packets 310 (S412), stores the data packets 310 (S414), and transmits the data packets 310 over an RF signal 316 to a third satellite 306 that is within RF communication range of the second satellite 305, where the third satellite 306 is disposed at a location 317 within the optical path 309 between the second satellite 305 and the destination ground station 303.

The third satellite 306 receives the data packets 310 (S418), stores the data packets 310 (S420), and transmits the stream of data packets 214 over another optical signal 319 to a fourth satellite 307 that is within optical communication range of the third satellite 306 (S422). In one example, the fourth satellite 307 is disposed at a location 320, where location 320 closer to the destination ground station 303 than locations 312, 315 or 317.

The fourth satellite 307 receives the data packets 310 (S424), stores the data packets 310 (S426), and, when within RF communication range of the destination ground station 303, transmits the data packets 310 over an RF signal 321 to the destination ground station 303 (S428). The destination ground station 303 receives the data packets 310 (S430), and routes the data packets 310 onto an earthbound network (S432), thereby ending process 400 (S433). Thus, packet-switched communications is enabled to originate from or be directed to any ground station within the communication capabilities of any of the network satellites 304 to 307.

In a further implementation of the satellite communication network, any or all of the network satellites may be disposed in MEO. Thus, the satellite communication networks 100 and 300 may include a combination of LEO and/or MEO satellites. Additionally, multiple network satellites may travel in multiple orbits, or the satellite communication network may include any number of satellites traveling in different directions, at different altitudes, with different orbital periods intersecting the space over the Earth's surface, using the same communications principles described above.

Since LEO/MEO satellite paths are not typically geostationary, a constellation of satellites may be used to provide continuous communication coverage at any particular location on the Earth's surface. Depending on the number of network satellites implemented and the selected paths of the various satellites, a particular satellite communication network implementation may be designed to provide any combination of continuous communication coverage at selected geographical locations on the Earth's surface, intermittent coverage at other selected geographical locations, and no coverage at remaining locations. In addition, a satellite communication network implementation may be deployed with a single satellite, as shown in FIG. 1, or with a limited number of satellites, and over time may be supplemented with additional network satellites to form an increasingly complex and extensive constellation that provides expanding coverage in selected geographical locations.

Furthermore, various implementations of the satellite communication network, as opposed to the exemplary shown in FIG. 3, may be configured to perform ground station-to-satellite-to-satellite-to-ground station packet-switched communication processes using any number of intermediary satellites. Thus, a process may merely include a first satellite, or first through Nth, where N represents any positive integer.

Moreover, various implementations of the satellite communication network may be configured to perform ground station-to-satellite-to-satellite-to-ground station packet-switched communication processes, such as the process demonstrated in FIG. 3, in real-time or near-real-time rapid. By "real-time," it is intended that each satellite transmits the stream of data packets to the next satellite (and eventually to the destination ground station) as quickly as the satellite is able to process the incoming signal and transmit the data packets.

In a further implementation, each network satellite is be configured to determine the next leg or hop of the process, and then wait until the next satellite comes onto communication range (if the various satellites have differing orbital paths), or wait until the destination ground station comes within communication range of the transmitting satellite before transmitting the data packets. In this instance, the total relay time for the stream of data packets to travel from the originating ground station to the destination ground station may be greater than the combined transmission time required simply to transmit the respective signals. For example, the total relay time may be on the order of minutes or hours, rather than the seconds or fraction of a second of combined actual transmission time expended to transmit the consecutive signals.

Figure 5:
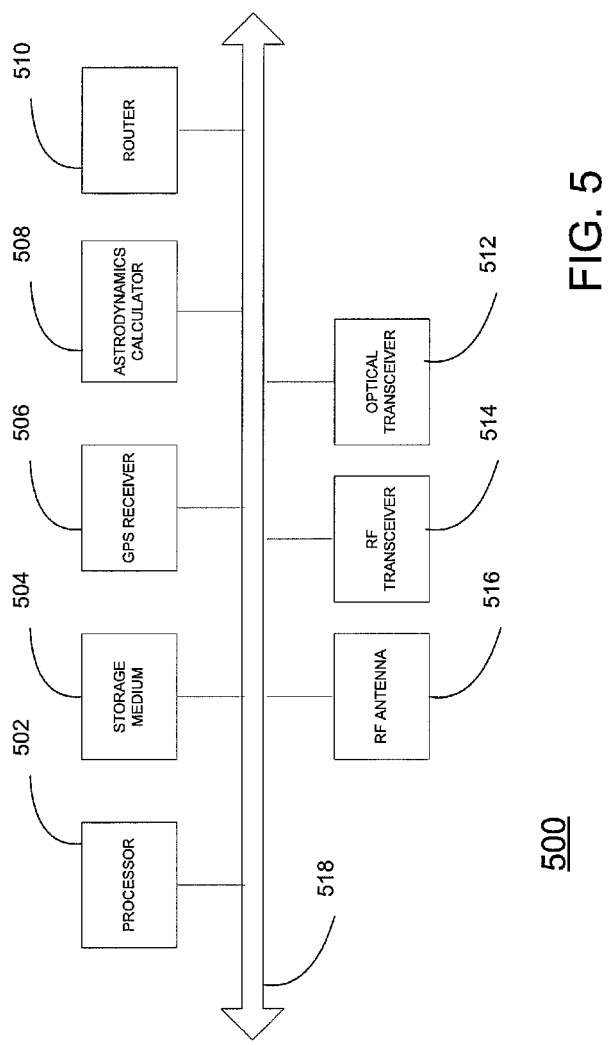
FIG. 5 is a schematic diagram illustrating an exemplary architecture configured for use with the satellite communication networks of FIGS. 1 and 3.

Referring to FIG. 5, a satellite architecture 500 that is suitable for use in the satellite communication network includes a processor 502, a storage medium 504, a global positioning system (GPS) receiver 506, an astrodynamics calculator 508, an Internet router 510, an optical transceiver 512, an RF transceiver 514, and an RF antenna 516, all of which are connected by a data bus 518.

The processor 502, for example, a microprocessor chip, executes computer program instructions stored in the memory 504 to implement operational functions of the satellite. In this regard, the processor 502 is one of a number of high-performance computer processors, including an INTEL® or AMD® processor, a POWERPC® processor, a MIPS® reduced instruction set computer ("RISC") processor, a SPARC® processor, an ACORN® RISC Machine ("ARM®") architecture processor, a HP ALPHASERVER® processor or a proprietary computer processor for a mainframe. In an additional arrangement, more than one processing unit is used, including a multiple CPU configuration of the type found in high-performance workstations and servers, or a multiple scalable processing unit of the type found in mainframes.

The storage medium 504 includes, for example, a high-volume (e.g., 240 gigabytes—one terabyte), low-mass (e.g., 3 kilogram), solid-state data recorder that has been flight-qualified for space applications. In addition to computer program instructions, the storage medium 504 also stores data received from the other network satellites and ground stations, such as the data packets. Suitable types of memory may include, for example, random-access memory ("RAM"), read-only memory ("ROM"), programmable read-only memory ("PROM"), erasable programmable read-only memory ("EPROM"), electrically erasable programmable read-only memory ("EEPROM"), magnetic disks, optical disks, floppy disks, hard disks, removable cartridges, flash drives, or other types of memory.

The GPS receiver 506 periodically receives navigational signals from Navigation Signal Timing and Ranging ("NAVSTAR") GPS satellites and calculates the current position of the satellite based on the signals. The GPS receiver 506 receives signals from at least one NAVSTAR GPS satellite, and uses ephemeris data regarding the locations of the NAVSTAR GPS satellites and clock data received from the NAVSTAR GPS satellites, to calculate the current position of the satellite based on the time delays associated with each of the various NAVSTAR GPS satellite signals. Alternatively, the GPS receiver 506 may calculate its current location based on historic data corresponding to the orbital path, in conjunction with signals from one or more NAVSTAR GPS satellites.

In other implementations, the GPS receiver 506 includes a global positioning receiver that is configured to operate with a satellite navigation system other than NAVSTAR GPS. For example, the receiver 506 may be based on the Russian Global Navigation Satellite System ("GLONASS"), or the European Galileo positioning system.

In addition, the satellite periodically transmits its own GPS-derived location information to other network satellites and ground stations, and periodically receives and stores GPS-derived location information regarding the other network satellites from the other satellites and from the ground stations. Thus, the satellite maintains a table in the storage medium 504 of recent location information regarding any or all of the other network satellites.

The astrodynamics calculator 508 calculates ephemeris information, including the orbital path of the satellite, as well as the orbital paths of other network satellites. For example, the astrodynamics calculator 508 may include a version of Satellite Tool Kit® ("STK®") satellite simulation software, a family of astrodynamics computer programs available from Analytical Graphics, Inc. (AGI) of Malvern, Pa., U.S.A. Based on the calculated orbital path and the current GPS-derived location information of the satellite, along with the calculated orbital paths and the recent location information of the other network satellites, the astrodynamics calculator 508 estimates when the satellite will be in communication range, or within the communications capabilities, of other network satellites or ground stations.

The onboard Internet router 510 uses the ephemeris data calculated by the astrodynamics calculator 508 and ephemeris information received from the other network satellites and the ground stations, along with knowledge regarding the network ground stations and network-compatible ground stations, to determine routing for data packets. Each satellite in the network functions as an Internet router with respect to neighboring satellites and ground stations, and/or forms a node in a mesh network.

In general, the router 510 determines whether to forward the data packets to another satellite that is forward in the same ring, to another satellite that is further back in the same ring, to another satellite in a different ring, or to a network ground station. The router 510 creates and continuously updates an adapted Internet routing table including the network satellites and ground stations that are currently in communication range or within its current communication capabilities, as well as the network satellites and ground stations that are not currently in communication range or within its current communication capabilities. The routing table includes distance or cost information based on the current available of network satellites and ground stations, as well as anticipated future availability of network satellites and ground stations.

In one example, the router 510 determines, based on routing table information regarding the current and anticipated future availability of network satellites and ground stations, to hold a received stream of data packets rather than forwarding the data packets to another network satellite that is currently available in order to forward the data packets to a different network satellite that is not currently available, but is anticipated to be available at a future time, and will result in a reduced delivery of the data packets to the destination ground station.

In another example, the router 510 determines, based on routing table information regarding the current and anticipated future availability of network satellites and ground stations, to forward a received stream of data packets to a currently available ground station that is not the nearest ground station to the final Internet destination address of the data packets, if the data packets are likely to reach the final Internet destination address earlier than if the data packets were held until the nearest ground station to the final Internet destination address were in communication range or within the communication capabilities of the satellite.

The optical transceiver 512 transmits and receives data, such as the stream of data packets and ephemeris information, to and from other network satellites. The optical transceiver 512 forms an optical link in conjunction with other network satellite optical transceivers. For example, the optical transceiver 512 may implement free space optics (FSO) technology, such as an infrared laser source and sensor. Although the satellite is described as utilizing an optical transceiver, in additional arrangements a non-optical transceiver is utilized in addition to or instead of the optical transceiver.

The RF transceiver 514 transmits and receives data, such as the stream of data packets 114 and ephemeris information, to and from other network satellites and ground stations. For example, the RF transceiver 514 may be configured to transmit and receive any combination of low-, medium-, high-, very high-, and ultra high-frequency signals, such as long-wave, amplitude modulation (AM), shortwave, and frequency modulation (FM) radio signals, as well as super high-frequency and extremely high-frequency signals, such as microwave signals.

The RF antenna 516 generates electromagnetic waves, which are propagated onto space, based on electric signals from the RF transceiver 514, and generates electric signals, which are propagated to the RF transceiver 514, from electromagnetic waves received from space. In one implementation, the RF antenna 516 is directional and moveable, and GPS information regarding the current location of other network satellites or ground stations is used to aim the antenna toward a signal source or target.

Figure 6:
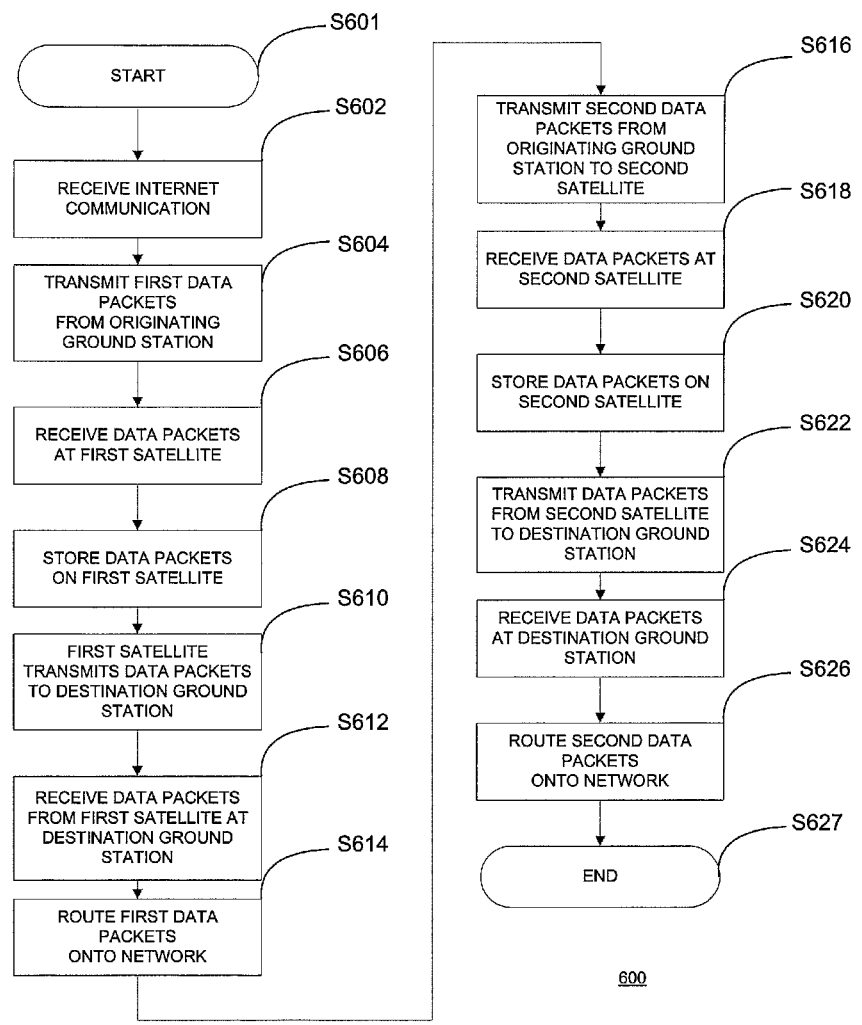
FIGS. 6 to 18 are flowcharts depicting exemplary processes for providing broadband communication using an enhanced satellite network.

FIG. 6 depicts an exemplary ground station-to-satellite-to-ground station packet-switched communication process 600 that transmits an Internet communication in multiple segments conveyed by multiple satellites. The process 600 may be utilized, for example, if a received Internet communication is too large to be fully transmitted at a data transmission rate supported by a first satellite during the time which the satellite is in communication range of the originating ground station. In this regard, the ground station may store the remaining portion of the communication and transmit it to a second satellite.

When the process 600 begins (S601), an originating ground station receives an Internet communication from an earthbound network destined for an Internet destination address that is associated with a destination ground station (S602). As a first satellite passes over the originating ground station, the ground station transmits a first stream of IP data packets including a first portion of the received Internet communication over a radio-frequency (RF) signal to the first satellite (S604). The first satellite receives the data packets (S606), and stores the data packets (S608).

The first satellite transmits the first stream of data packets over an RF signal to the destination ground station (S610) while passing near the destination ground station. The destination ground station receives the first stream of data packets (S612), and routes the data packets onto another earthbound network (S614).

When a second satellite comes within communication range of the originating ground station, the ground station transmits a second stream of IP data packets including a second portion of the received Internet communication over the RF signal to the second satellite (S616). The second satellite receives the data packets (S618), and stores the data packets (S620). The second satellite transmits the second stream of data packets over an RF signal to the destination ground station when the destination ground station comes within communication range of the second satellite (S622). The destination ground station receives the second stream of data packets (S624), and routes the data packets onto an earthbound network (S626), thereby ending process 600 (S627).

The originating ground station may transmit additional portions of the received Internet communication to additional satellites, or to the same satellites during consecutive or non-consecutive passes, as is convenient to transmit the entire communication. In this manner, the received communication may be uploaded to any number of satellites and downloaded to the destination ground station in segments by the various satellites during sequential or non-sequential passes of the satellites in the vicinity of the ground stations.

In addition, the specific ordering of downloads to the destination ground station with regard to subsequent uploads to other satellites is not necessarily sequential. For example, the first stream of data packets may be uploaded to the first satellite, after which the second stream of data packets may be uploaded to the second satellite before the first satellite has downloaded the first stream of data packets to the destination ground station. In this example, the first satellite may download the first stream of data packets to the destination ground station, after which the second satellite may download the second stream of data packets, or vice versa. Furthermore, the destination ground station may store the first stream of data packets and any subsequently-received streams of data packets, until the entire communication has been received before routing the data packets including the entire communication onto the other earthbound network.

Figure 7:
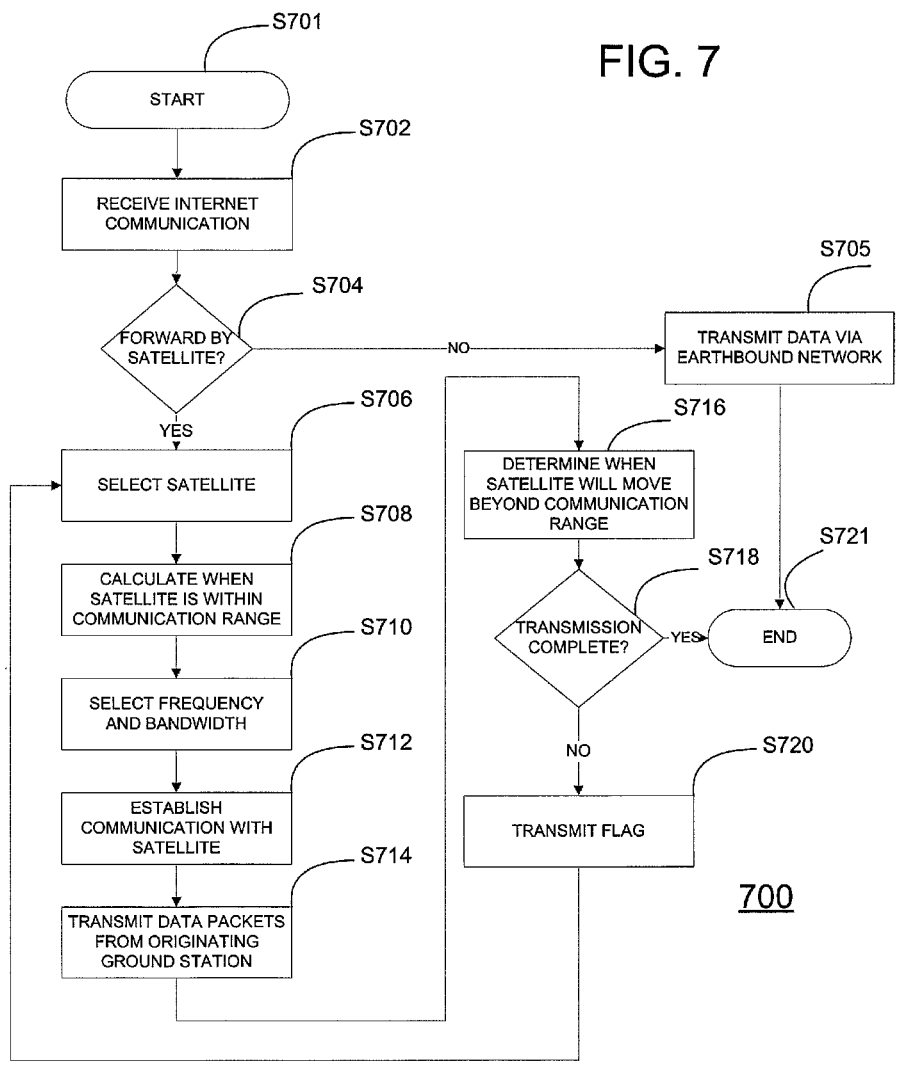

FIG. 7 is a flowchart depicting an exemplary process 700 for providing ground station-to-satellite-to-ground station packet-switched communication from the perspective of an originating ground station. When the process 700 begins (S701), an originating ground station receives an Internet communication from an earthbound network destined for an Internet destination address that is associated with a destination ground station (S702), and determines whether the received communication is to be forwarded by satellite or by a land-based network (S704). If the communication is to be forwarded by a land-based network (S704), the data is transmitted by earthbound network (S705) and the process 700 ends (S721).

If the communication is to be forwarded by satellite (S704), the originating ground station selects a satellite with which to communicate (S706). For example, the ground station may select to communicate with the next network satellite that will pass over the ground station, the next satellite that will pass over the originating ground station and will also pass over the destination ground station, a satellite that will pass over the originating ground station and facilitate the quickest delivery of the communication or the shortest route to the destination ground station, or another satellite.

In order to determination which satellite to select, the originating ground station may use ephemeris information regarding the network satellites, or an astrodynamics calculator, such as an orbital estimator or propagator, to estimate when and for what duration individual network satellites will be in communication range. Furthermore, the originating ground station may access knowledge of network ground stations and network-compatible ground stations, and/or memory capacities and transmission rates of individual network satellites, and the total length of the received communication.

Once a satellite has been selected, the ground station calculates when the selected satellite will be "in sight," or within communication range of the ground station (S708). The ground station also selects a radio frequency and data transmission rate that are supported by the satellite (S710). For example, the ground station may access a lookup table that is maintained in memory with the frequencies and transmission rates supported by each of the network satellites, including periodic updates provided from the satellites or a central network database.

Similarly, the selection of a frequency and bandwidth (S710) may include transmitting a request to a central network database to receive up-to-date frequency and transmission rate information regarding the selected satellite. When the ground station expects the selected satellite to be within communication range, the ground station establishes communication with the satellite (S712). For example, the ground station may perform a handshake protocol or request a Transmission Control Protocol (TCP) connection with the satellite. Establishing communication may also include implementing an authentication protocol, such as a tiered authentication protocol, to verify the source of the signal.

Once communication with the satellite has been established, the originating ground station transmits a stream of data packets including the received communication over an RF signal to the satellite (S714). The originating ground station also determines when the satellite will move beyond the communication range of the originating ground station (S716). Before the satellite goes out of range, the ground station may verify if the transmission has been completed, that is, whether the entire communication has been uploaded to the satellite (S718). If the transmission is completed (S718), the process 700 ends (S721). Otherwise, if the transmission has not been completed, the ground station transmits a "flag" in the form of a digital code indicating that the communication includes additional data (S720). The ground station may repeat (S706-S720) a substantial portion of the process with an additional satellite, which may be the same satellite traveling on a subsequent pass over the ground station, or another network satellite altogether.

Figure 8:
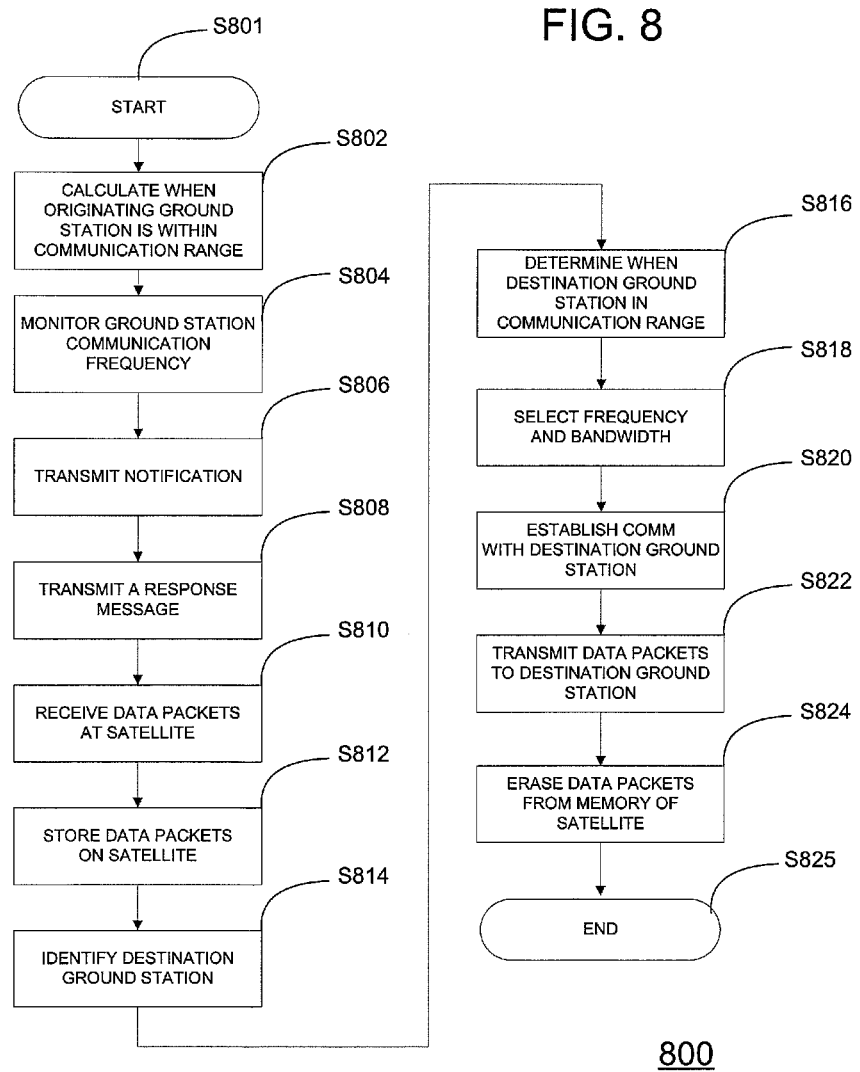

FIG. 8 is a flowchart depicting an exemplary process 800 for providing ground station-to-satellite-to-ground station packet-switched communication from the perspective of the satellite. When the process 800 begins (S801), a network satellite calculates when a network ground station will be in sight, or within the communication range of the satellite (S802). In order to make this determination, the satellite uses ephemeris information regarding its orbital path, including information determined by an onboard astrodynamics calculator, such as an orbital estimator or propagator, along with other data such as information regarding the locations of network ground stations.

When the satellite is calculated to be within range of the ground station, the satellite monitors a radio frequency or range of frequencies that the ground station is expected to use to initiate communications (S804). In addition, the satellite may transmit a notification over an RF signal to alert the ground station that the satellite is in range (S806).

When the ground station attempts to establish communication with the satellite, the satellite transmits a response message to the ground station (S808), for example, using a handshake protocol or opening a TCP connection. Once communication between the satellite and the ground station has been established, the satellite receives a stream of data packets including a partial or complete Internet communication over an RF signal from the ground station (S810), and stores the stream of data packets (S812). The data packets may include a flag that indicates that the communication is not complete.

In some implementations, the data packets contain the identity of the destination ground station, for example, in a data packet header. In other implementations, the satellite optionally identifies (S814) the destination ground station based on the Internet destination address included in the data packet headers, in accordance with the IP. For example, the satellite may identify the network ground station that is geographically nearest the physical location of the Internet destination address. As another exemplary, the satellite may identify the network ground station expected to provide the shortest or quickest route to the Internet destination address. The satellite further determines (S816) when the destination ground station will be in communication range The satellite also selects a radio frequency and data transmission rate that are supported by the ground station (S818). For example, the satellite may access a lookup table that it maintains in memory with the frequencies and transmission rates supported by each of the network ground stations in its communication capabilities, including periodic updates provided from the ground stations or a central network database. Similarly, selection may include transmitting a request to a central network database to receive up-to-date frequency and transmission rate information regarding the destination ground station. When the destination ground station is expected to be in communication range, the satellite establishes communication with the ground station (S820), and transmits the stream of data packets over the selected RF signal to the destination ground station (S822). The satellite erases the transmitted data packets from memory, for example, by modifying a memory index table to no longer indicate the locations of the data packets in the memory (S824), thereby ending the process 800 (S825).

Figure 9:
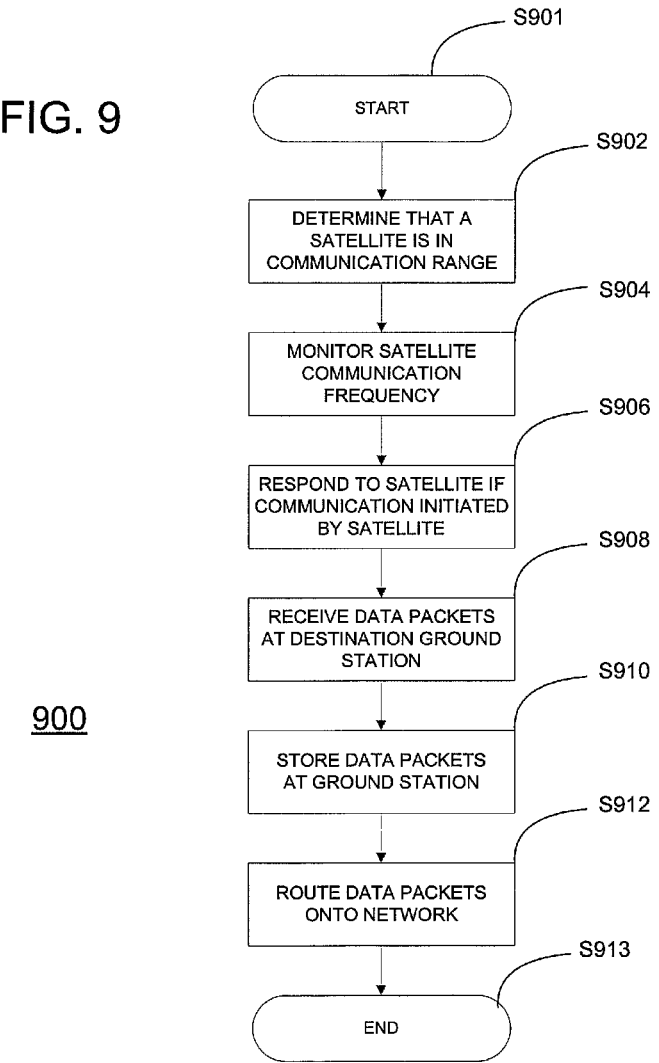

FIG. 9 is a flowchart depicting a process 900 for communicating a ground station-to-satellite-to-ground station packet-switched communication, from the perspective of a destination ground station. When the process 900 begins (S901), a network ground station, the destination ground station, determines that a network satellite will be in communication range (S902). When the satellite is expected to be in range, the ground station monitors a radio frequency that the satellite is known to use to initiate communications (S904). If the satellite attempts to establish communication with the ground station, the ground station responds to the satellite, for example, using a handshake protocol or by opening a TCP connection (S906).

Once communication between the satellite and the ground station has been established, the ground station receives a stream of data packets including a partial or complete Internet communication over an RF signal from the ground station (S908), and stores the stream of data packets (S910). The destination ground station routes the stream of data packets onto an earthbound network associated with the ground station (S912), thereby ending the process 900 (S901). If the data packets include a flag indicating that the communication is not complete, the destination ground station may store the stream of data packets, and any subsequent streams of data packets, until the entire communication has been received before routing the data packets including the entire communication onto the earthbound network. Alternatively, the stream of data packets may be routed onto the network as an incomplete communication, even if the flag exists in the stream of data packets.

Figure 10:
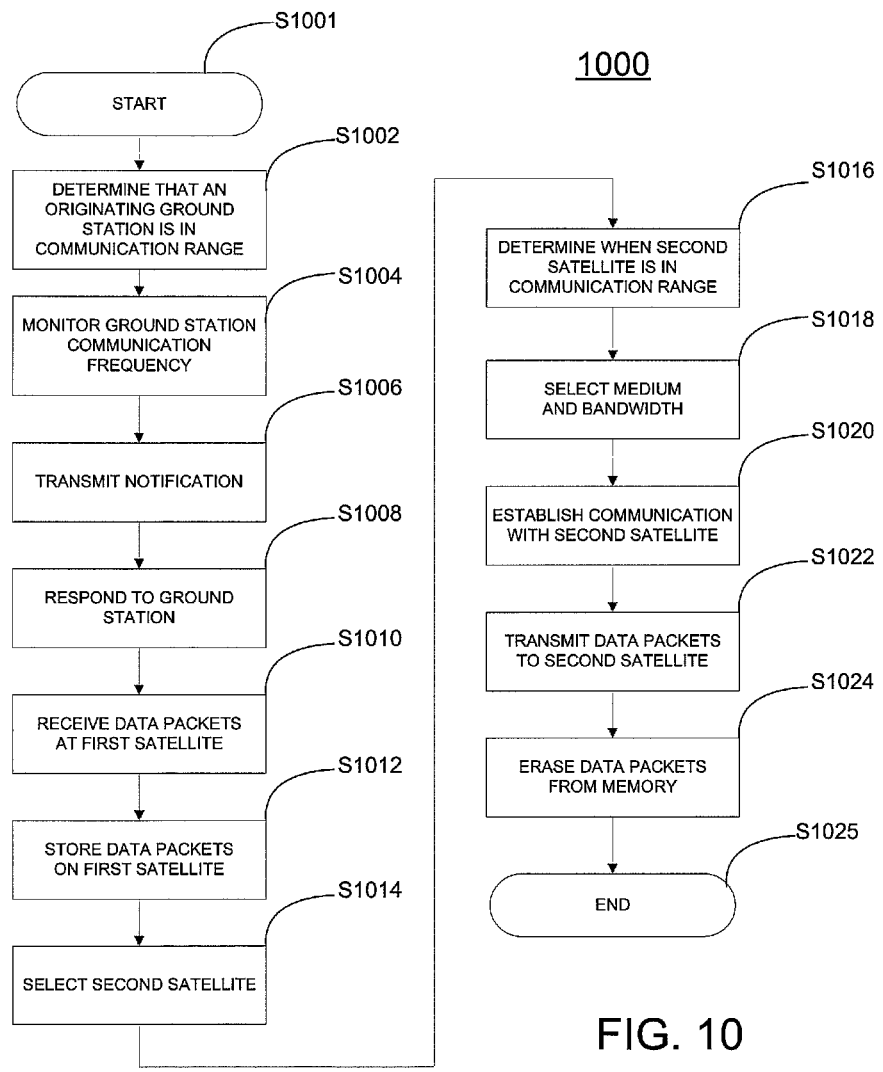

FIG. 10 is a flowchart depicting a process 1000 for providing ground station-to-satellite-to-satellite-to-ground station packet-switched communication, from the perspective of a first satellite. When the process 1000 begins (S1001), a first network satellite determines that a network ground station is in communication range (S1002).

When the satellite expects to be within range of the ground station, the satellite monitors a radio frequency that the ground station uses to initiate communications (S1004). In addition, the satellite may transmit a notification over an RF signal to alert the ground station that the satellite is in communication range (S1006). If the ground station attempts to establish communication with the satellite, the satellite responds to the ground station using a handshake protocol or opening a TCP connection (S1008). Once communication between the satellite and the ground station has been established, the first satellite receives a stream of data packets including a partial or complete Internet communication over an RF signal from the ground station (S1010), and stores the data packets (S1012).

The first satellite selects a second satellite, such as a satellite which is closer to the destination ground station than the first satellite (S1014), and determines when the second satellite will be in range (S1016). The second satellite is not necessarily physically closer to the destination ground station, but rather, the second satellite provides a better path to the destination ground station. For example, the second satellite may currently be physically farther from the destination ground station than is the first satellite, but may concurrently be in communication range of both the first satellite and a third satellite that is physically closer to the destination ground station than is the first satellite or second satellite.

The first satellite also selects a transmission medium, such a radio frequency or an optical link, and a data transmission rate that are supported by both the first satellite and the intermediate satellite (S1018). When the second satellite is expected to be in communication range, the first satellite establishes communication with the second satellite (S1020), as explained above, and transmits (S1022) the stream of data packets over the selected medium to the second satellite. The first satellite may also erase the transmitted data packets from memory, for example, by modifying a memory index table to no longer indicate the locations of the data packets in the memory (S1024), thereby ending the process 1000 (S1025).

Figure 11:
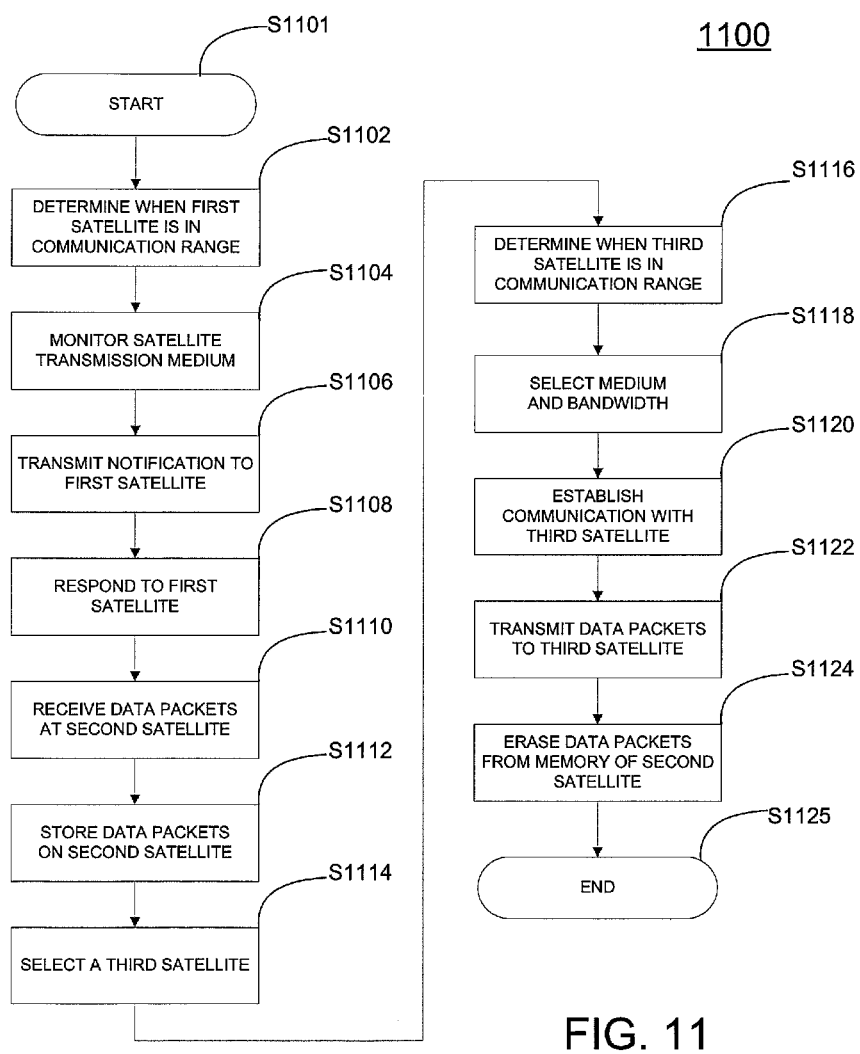

FIG. 11 is a flowchart illustrating a process 1100 for providing a ground station-to-first satellite-to-second satellite-to-third satellite-to-ground station packet-switched communication, from the perspective of the second satellite. The second satellite determines when the first satellite is in communication range (S1102), and monitors a transmission medium, such as a radio frequency or an optical link, that the other satellite is known to use to initiate intersatellite communications (S1104).

The second satellite may transmit (S1106) a notification over an RF signal or an optical link to alert the other satellite that the intermediate satellite is in communication range. If the first satellite attempts to establish communication with the second satellite, the second satellite responds to the first satellite (S1108). Once communication between the two satellites has been established, the second satellite receives a stream of data packets including a partial or complete Internet communication from the first satellite (S1110), and stores the data packets (S1112).

The second selects a third satellite that is closer (or has a shorter transmission time) to the destination ground station than is the first intermediate satellite (S1114) and determines when the third satellite will be in range (S1116). The selection of a "closer" satellite does not necessarily mean that the third satellite is physically closer to the destination ground station.

The second also selects (S1118) a transmission medium, such as a radio frequency or an optical link, and a data transmission rate that are supported by both intermediate satellites. When the third satellite is within communication range, the second satellite establishes communication with the third satellite (S1120), and transmits the stream of data packets over the selected medium to the second intermediate satellite (S1122). The second satellite may also erase the transmitted data packets from memory (S1124), thereby ending the process 1100 (S1125).

Figure 12:
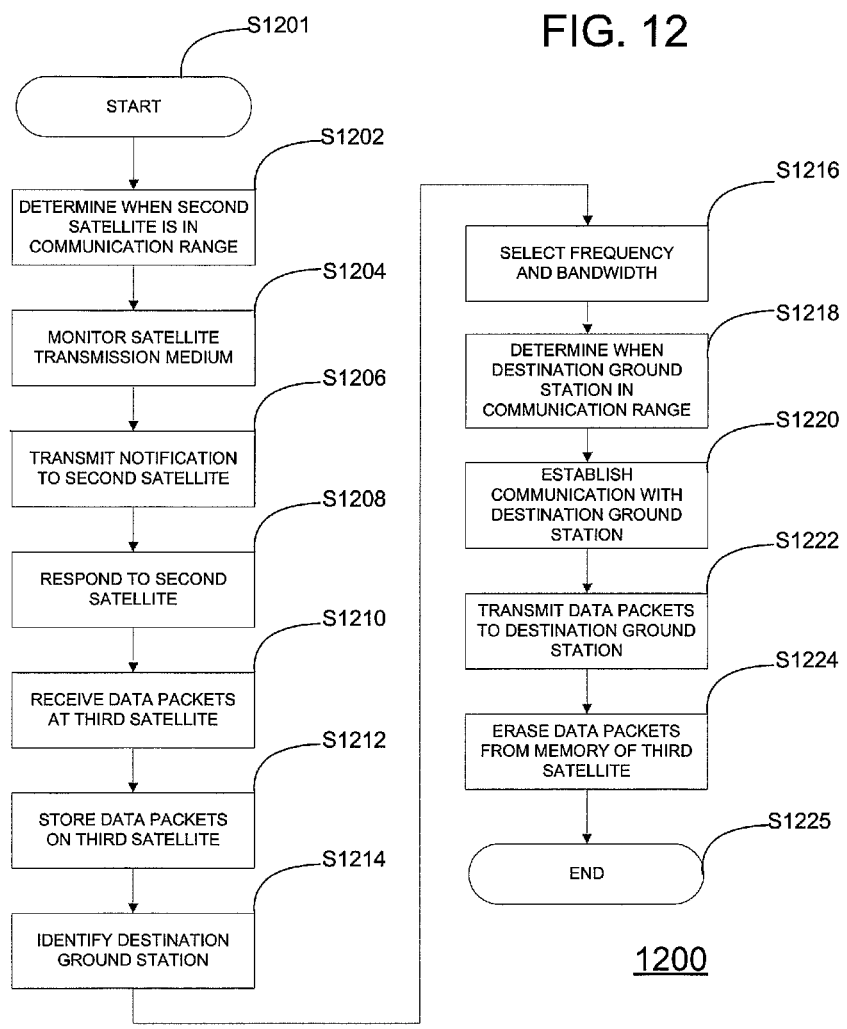

FIG. 12 is a flowchart depicting a process 1200 for providing ground station-to-first satellite-to-second satellite-to-third satellite-to-ground station packet-switched communication from the perspective of the third satellite. When process 1200 begins (S1201), the third satellite determines when the second satellite is in communication range (S1202). When the second satellite is expected to be within range, the third satellite monitors a transmission medium that the other satellite is known to use to initiate intersatellite communications (S1204). In addition, the final satellite may transmit a notification to alert the second satellite that the third satellite is in communication range (S1206).

If the second satellite attempts to establish communication with the third satellite, the third satellite responds (S1208). Once communication between the two satellites has been established, the third satellite receives a stream of data packets including a partial or complete Internet communication from the other satellite (S1210), and stores the data packets (S1212).

The third satellite identifies the destination ground station, either directly from the data packets or based on the Internet destination address included in the data packet headers (S1214), and selects a radio frequency and data transmission rate that are supported by the ground station (S1216). The third satellite determines when the destination ground station will be in communication range (S1218).

When the destination ground station is expected to be within communication range, the third satellite establishes communication with the ground station (S1220), and transmits the stream of data packets to the destination ground station (S1222). The third satellite also erases the transmitted data packets from memory (S1224), thereby ending the process 1200 (S1225).

Figure 13:
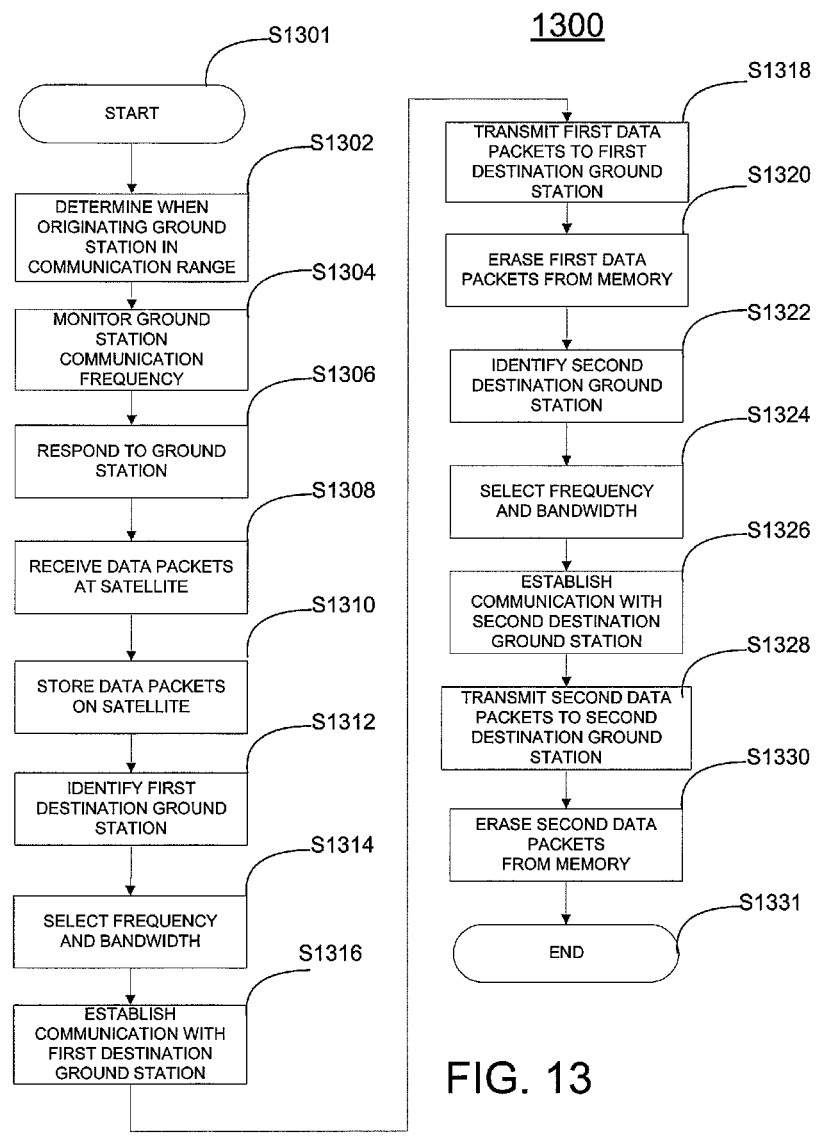

FIG. 13 is a flowchart depicting a process 1300 for providing multiple ground station-to-satellite-to-ground station packet-switched communications, from the perspective of a satellite. When the process 1300 begins (S1301), the network satellite determines when a network ground station will be in communication range (S1302). When the ground station is expected to be in range, the satellite monitors a radio frequency that the ground station uses to initiate communications (S1304).

If the ground station attempts to establish communication with the satellite, the satellite responds (S1306). Once communication between the satellite and the ground station has been established, the satellite receives a stream of data packets including two different partial or complete Internet communications from the ground station (S1308) and stores the data packets (S1310).

The satellite identifies a first destination ground station for the first received communication (S1312), and selects a radio frequency and data transmission rate that are supported by the ground station (S1314). When the first destination ground station is in communication range, the satellite establishes communication with the ground station (S1316), and transmits the portion of the stream of data packets corresponding to the first received communication to the first destination ground station (S1318). The satellite erases the transmitted data packets including the first received communication from memory (S1320).

The satellite further identifies a second destination ground station for the second received communication (S1322), and selects a radio frequency and data transmission rate that are supported by the ground station (S1324). When the second destination ground station is within communication range, the satellite establishes communication with the ground station (S1326) and transmits the portion of the stream of data packets corresponding to the second received communication to the second destination ground station (S1328). The satellite erases the transmitted data packets including the second received communication from memory (S1330), thereby ending the process 1300 (S1331).

Figure 14:
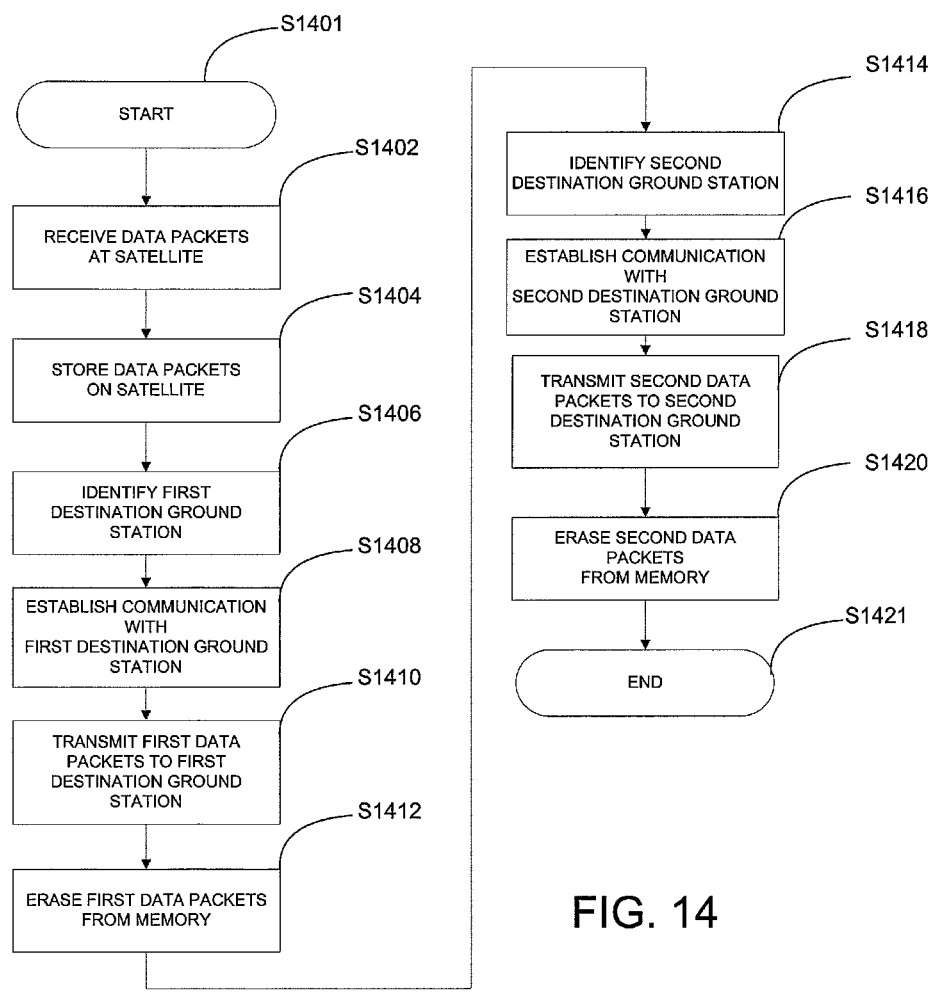

FIG. 14 is a flowchart depicting a process 1400 for providing a ground station-to-satellite-to-multiple ground stations packet-switched communication, from the perspective of the satellite. Using the process 1400, a more rapid delivery of an Internet communication to a remote destination may be effectuated when a carrier satellite does not remain in range of a single ground station for a sufficient length of time to transmit an entire communication that is stored in the satellite memory.

The process 1400 begins (S1401), and a network satellite receives a stream of data packets including a partial or complete Internet communication from a network ground station (S1402), and stores the data packets (S1404). The satellite identifies a first destination ground station for a first portion of the received communication (S1406).

When the first destination ground station is within communication range, the satellite establishes communication with the ground station (S1408), and transmits the first portion of the stream of data packets corresponding to a first portion of the received communication to the first destination ground station (S1410). The satellite erases the transmitted data packets including the first portion of the received communication from memory (S1412).

The satellite further identifies a second destination ground station for the a second portion of the received communication (S1414). When the second destination ground station is within communication range, the satellite establishes communication with the ground station (S1416), and transmits a second portion of the stream of data packets corresponding to a second portion of the received communication to the second destination ground station (S1418). The satellite erases the transmitted data packets including the second portion of the received communication from memory (S1420).

Using the process 1400, the first and second destination ground stations independently route the first and second portions of the Internet communication to the Internet destination address specified in the data packets. Alternatively, the first destination ground station may forward the first portion of the stream of data packets to the second destination ground station to be united with the second portion of the stream of data packets before the entire stream of data packets are routed to the Internet destination address specified in the data packets.

Figure 15:
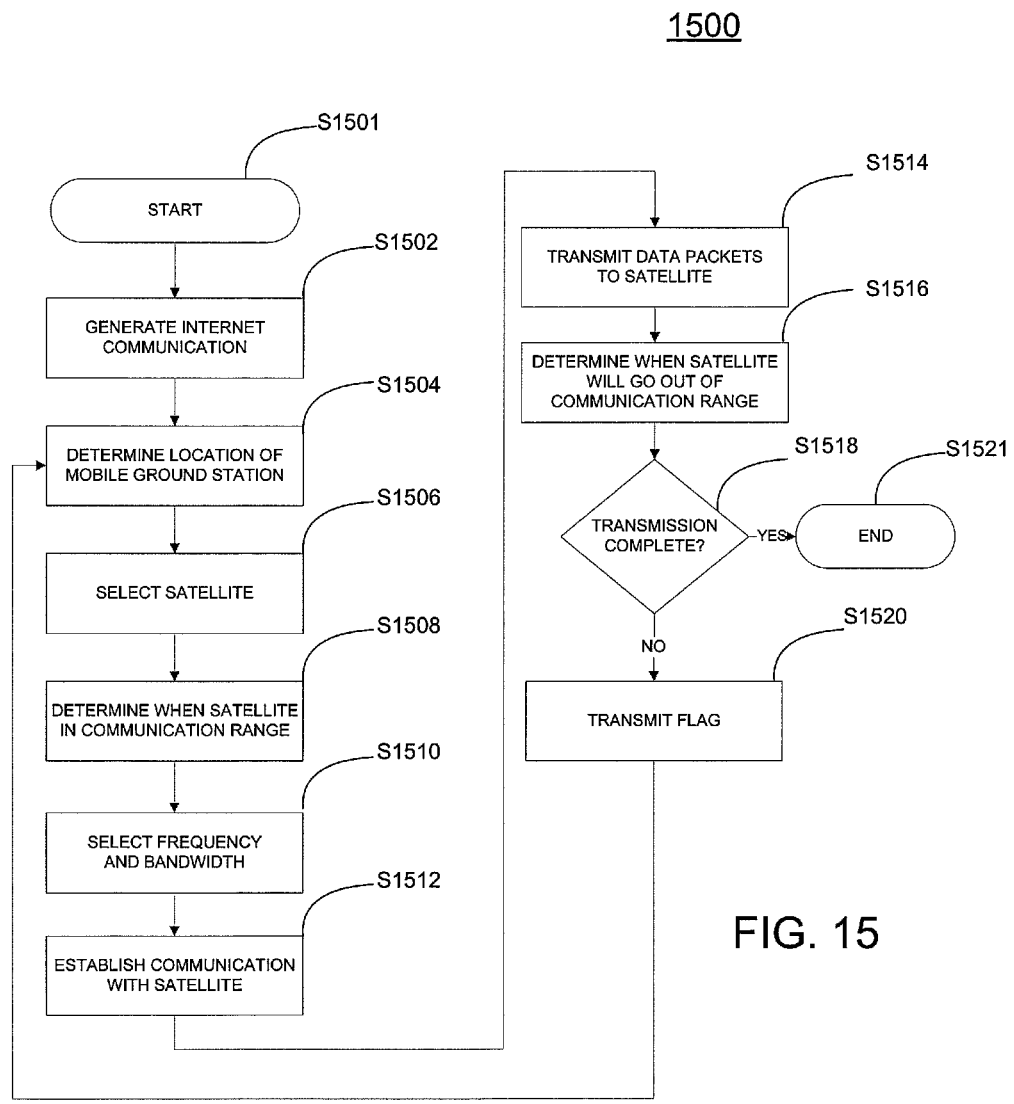

FIG. 15 is a flowchart depicting a process 1500 for providing a mobile ground station-to-satellite-to-mobile ground station packet-switched communication, from the perspective of an originating mobile ground station. When the process 1500 begins (S1501), an originating mobile ground station generates an Internet communication (S1502), and determines its current location, for example, using a GPS receiver (S1504). The mobile ground station selects a satellite for the Internet communication (S1506), and determines when the selected satellite will be in communication range (S1508). If the mobile ground station is in motion, the satellite selection may include predicting a mobile ground station path of motion, based on the current direction and velocity of the mobile ground station.

The mobile ground station also selects a radio frequency and data transmission rate that are supported by the satellite (S1510). When the originating mobile ground station expects the selected satellite to be within communication range, the mobile ground station establishes communication with the satellite (S1512), and transmits a stream of data packets to the satellite including the Internet communication, as well as the current location of the mobile ground station to be forwarded to a central database (S1514).

The mobile ground station also determines when the satellite will go out of communication range (S1516), and before the satellite goes out of range, verifies whether or not the transmission has been completed (S1518). If the transmission has been completed (S1518), the process 1500 ends (S1521). Otherwise, if the transmission has not been completed (S1518), the ground station transmits a flag indicating that the communication includes additional data (S1520), and repeats a substantial portion of the process 1500 with an additional satellite. Subsequent communication may be with the same satellite on another pass near the mobile ground station, or on another network satellite altogether.

Figure 16:
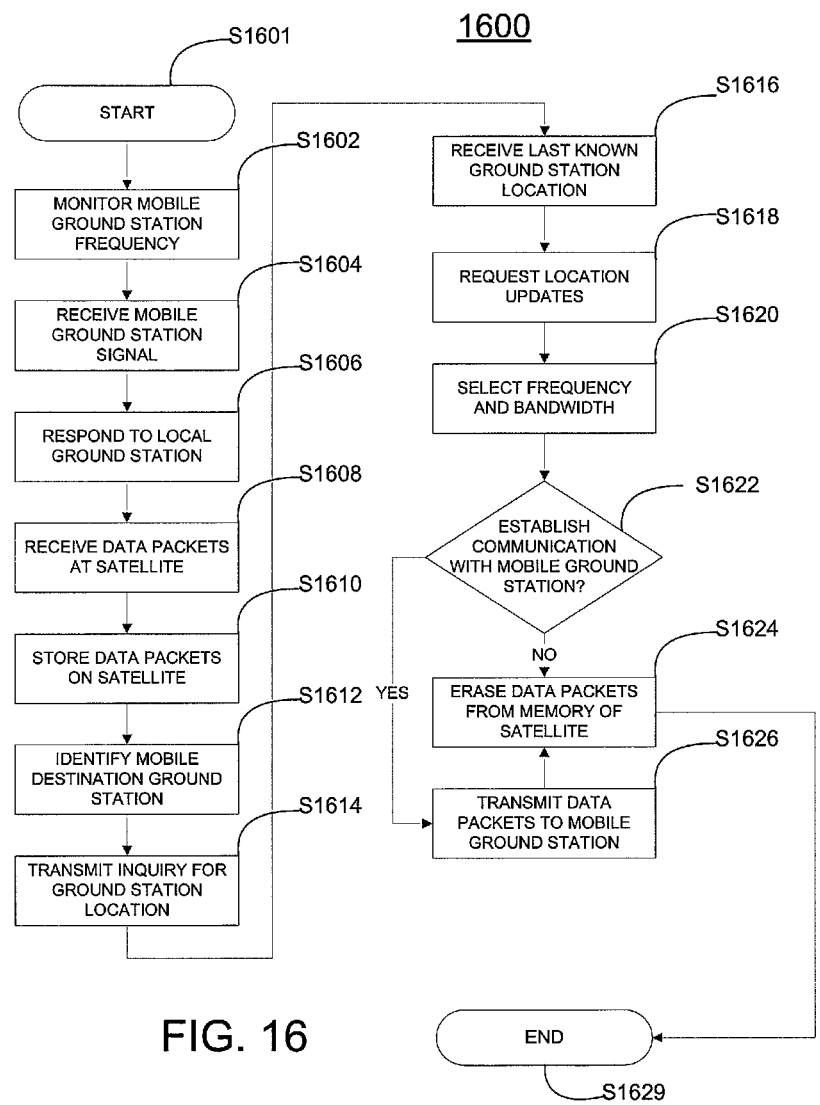

FIG. 16 is a flowchart depicting a process 1600 for providing a mobile ground station-to-satellite-to-mobile ground station packet-switched communication, from the perspective of the satellite. When the process 1600 begins (S1601), a satellite monitors a local mobile ground station radio frequency, for example, based on the current geographical footprint of the satellite communication capabilities (S1602), and receives a local mobile ground station RF signal alerting the satellite that a mobile ground station is in range and is attempting to establish communication with the satellite (S1604).

The satellite responds to the mobile ground station, using a handshake protocol or opening a TCP connection (S1606). Once communication between the satellite and the originating mobile ground station has been established, the satellite receives a stream of data packets including a partial or complete Internet communication, (S1608) and stores the data packets (S1610).

The satellite identifies a mobile destination ground station, either directly from the data packets or based on the Internet destination address included in the data packet headers (S1612), and transmits an inquiry to a central database requesting the last known location of the mobile destination ground station (S1614). The satellite receives (S1616) the last known location of the mobile destination ground station and determines when the mobile destination ground station is expected to be in communication range.

The satellite transmits a request to the central database requesting updates regarding the location of the mobile destination ground station until the mobile ground station is expected to be in communication range (S1618). The satellite also selects a radio frequency and data transmission rate that are supported by the mobile ground station (S1620). When the mobile destination ground station is expected to be in communication range, the satellite attempts to establish communication with the mobile ground station (S1622).

If communication is not established, such as if the mobile ground station does not respond after a predetermined number of attempts or a predetermined time period (S1622), the satellite erases the data packets from memory (S1622), thereby ending the process 1600 (S1629). Otherwise, if communication with the mobile ground station is established (S1622), the satellite transmits the stream of data packets to the mobile destination ground station (S1626), and erases the transmitted data packets from memory (S1628), thereby ending the process 1600 (S1629).

Figure 17:
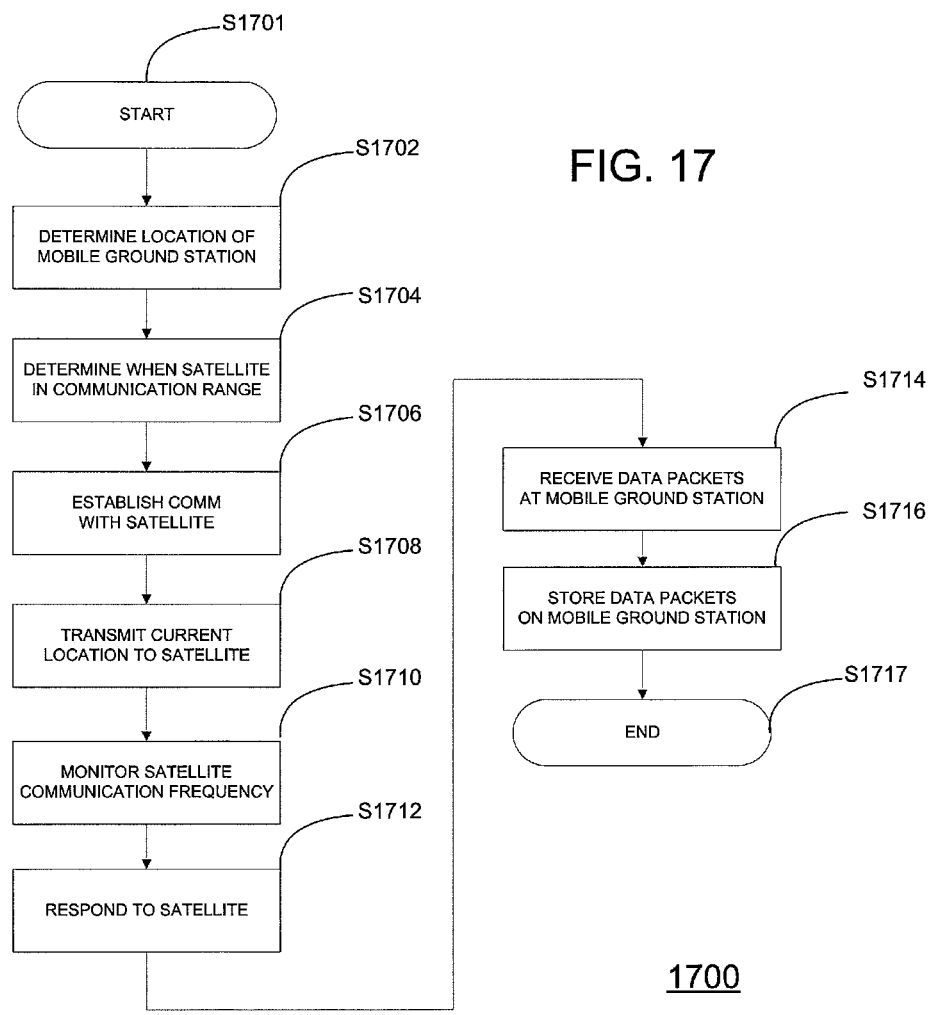

FIG. 17 is a flowchart depicting a process 1700 for providing mobile ground station-to-satellite-to-mobile ground station packet-switched communication, from the perspective of the destination mobile ground station perspective. When the process 1700 begins (S1701), a mobile ground station determines its current location, for example, using a GPS receiver (S1702). The mobile ground station determines when a network satellite will be in communication range, and when the satellite is in expected to be communication range (S1704), establishes communication with the satellite (S1706), and transmits its current location information to the satellite to be forwarded to a central database (S1708).

The ground station also monitors a radio frequency that the satellite is known to use to initiate communications (S1710). If the satellite attempts to establish communication with the mobile ground station, the ground station responds to the satellite (S1712). Once communication between the satellite and the mobile ground station has been established, the ground station receives a stream of data packets including a partial or complete Internet communication over an RF signal from the ground station (S1714) and stores the data packets (S1716), thereby ending the process 1700.

In another implementation, a mobile originating ground station may transmit a communication by way of a stationary destination ground station, or a stationary originating ground station may transmit a communication by way of a mobile destination ground station. Thus, numerous communication route combinations are envisioned.

Figure 18:
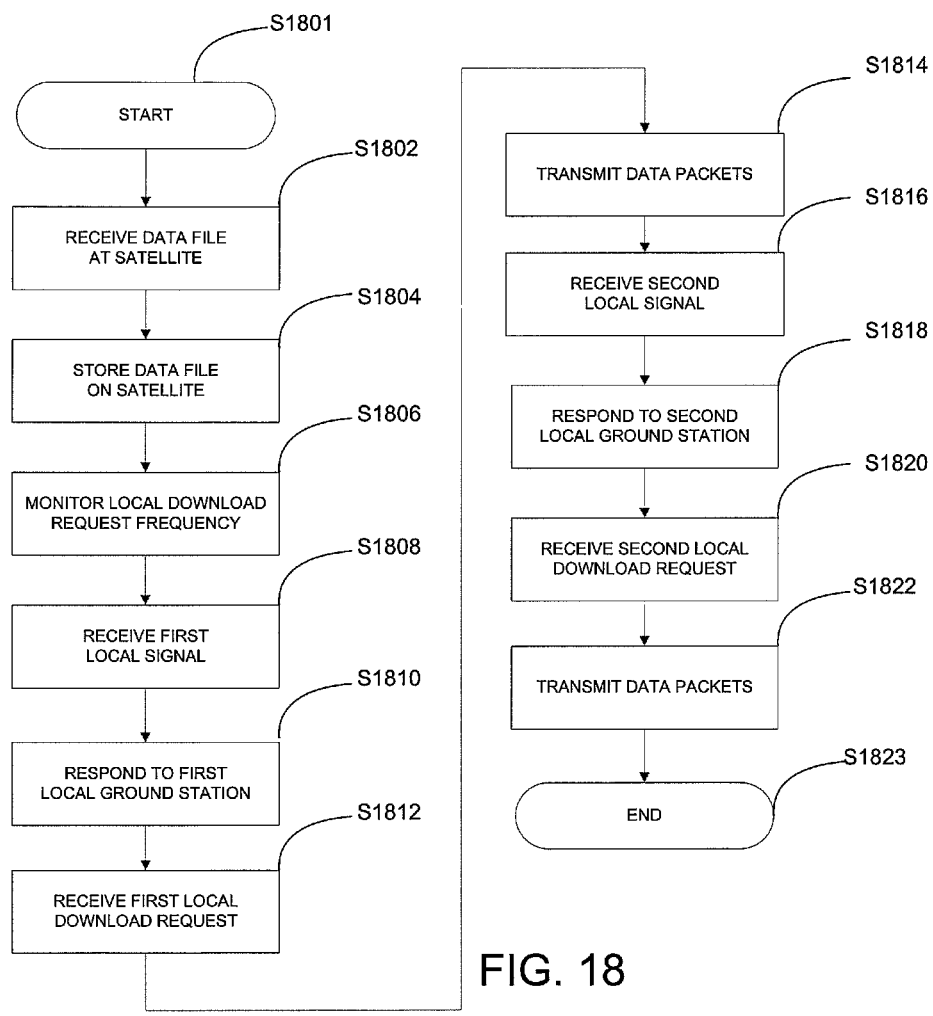

FIG. 18 is a flowchart depicting a process 1800 for providing a multicast satellite-to-multiple ground station packet-switched communication. When process 1800 begins, a network satellite receives a data file to be multicast, such as a video file or an audio file, (S1802) and stores the data file (S1804). The satellite monitors a local download request radio frequency, for example, based on the current geographical footprint of the satellite communication capabilities (S1806), and receives a first local download request RF signal alerting the satellite that a local ground station is in range and is attempting to establish communication with the satellite (S1808).

The satellite responds to the first local ground station, for example, using a handshake protocol or opening a TCP connection (S1810). Once communication has been established between the satellite and the first local ground station, the satellite receives a download request from the local ground station, for example, requesting a video file or audio file download (S1812). In response, the satellite transmits a stream of data packets including the requested file, or a portion of the file, to the first local ground station (S1814).

The satellite receives a second local download request RF signal alerting the satellite that another local ground station is in range and is attempting to establish communication with the satellite (S1816). The satellite responds to the second local ground station (S1818), and once communication has been established between the satellite and the local ground station, receives a download request from the second local ground station (S1820) and transmits a stream of data packets including the requested file, or a portion of the file, to the other local ground station (S1822), thereby ending the process 1800 (S1823).

Alternatively, the data file may be downloaded in segments, or "dribble-fed" during multiple consecutive or non-consecutive passes of the satellite over the local ground station, which may later reassemble the file for presentation as a single entity, for example, a viewing a movie or listening to music.

Throughout this disclosure, reference is made to network satellites, and network ground stations and ground stations. Nevertheless, these terms generally include network-compatible satellites and network-compatible ground stations and ground stations that are not necessarily part of the network in a strict sense. For example, network satellites may include satellites that are separately owned and operated, but that are able to interact with the network and participate in network functions. Similarly, network ground stations may include ground stations that are separately owned and operated, but that are able to transmit and receive Internet communications to and from network satellites.

Furthermore, network ground stations, or ground stations, generally fall onto two categories: ground station gateways and user terminals. Ground station gateways are portals to the network, which are connected to other land-based networks or the Internet to route communications onto the satellite communication network, and typically have substantial memory and transmission capacity, as well as antennas with multiple beams that may be switched to track the next satellite in anticipation of a handoff. User terminals are independent land-based, satellite-transmission-capable entities, and typically have only sufficient memory and transmission capacity to serve the user terminal.

In some implementations of the satellite communication network, the radio frequency selected or used in a particular geographical locale may depend on governmental regulation, such as frequency spectrum licensing. Thus, for example, a license may be required for the use of a particular frequency in the geographical area of a particular nation. In addition, for example, while a particular frequency may be used by network satellites and ground stations in a remote area where a license is not required for the use of the particular frequency, in other more populated areas where the use of the particular frequency requires a license some other frequency may be used by network satellites and ground stations.

In certain areas, network satellites may be able to use a frequency that requires a license, even though a license has not been granted to the network operator, based on the strength of the satellite signal being below a predetermined threshold power density. In further implementations, a frequency switching algorithm may be shared between the satellites and ground stations to determine the particular frequency at which the satellite broadcasts during a specific time period.

Furthermore, network satellites and ground stations may use harmonized unlicensed frequency spectra to provide service in areas where licensed spectrum is not available, or where large amounts of data in these frequency spectra will not interfere with terrestrial communications. In some implementations, the satellites may have several frequency systems the implement multiple frequency approaches, such as nested patches or multiple feeds in a single reflector. Thus, for example, over some areas of the Earth where interference is low, such as an ocean or desert, a satellite may transmit and receive in unlicensed bands, avoiding the cost of spectrum licenses.

The satellite communication network utilizes predictive orbital information at the receiver level. Each satellite and ground station has an embedded GPS receiver and an orbit propagation program, as well as a unique terminal identifier. In addition, because the satellite is moving in its orbit, the center frequency shifts due to the Doppler effect, which creates a unique signature that may be recognized by the ground receiver to locate the satellite signal in the noise floor. Updating the ephemeris information using GPS data embedded in the satellite communications signal, each receiver solves for position, velocity, range, and Doppler, and uses this information to optimize the communications channel.

For example, in an implementation, the network satellites configured to use five categories of frequency spectra: Little LEO spectrum, 2.4 GHz S-band (unlicensed), 5.6 GHz C-band (unlicensed), Ku-band and licensed spectrum. Frequency selection may be performed as follows.

If low-bandwidth, penetrating transmission is needed, some LEO spectrum is selected, regardless of location. Otherwise, if high-bandwidth transmission is needed, the selection may be performed as follows, based on GPS and ephemeris information. Ku-band is selected for communications with ground station gateways, 2.4 GHz unlicensed spectrum is selected if permitted in current location, 5.6 GHz unlicensed spectrum is selected if permitted in current location, or licensed spectrum is selected if no other option is available.

In addition, the satellite RF signal power density may be adjusted based on the current geographical location of the satellite, or focused to provide higher capacity to selected areas, resulting in more efficient use of battery power. For example, beam-forming and beam-steering technology may be implemented, including scalar phase signals. These technologies also permit the satellites to hand off communication links without dropping data streams. Furthermore, network satellite transceivers may be switched "on" and "off" based on the current geographical location of the satellite in order to save power and prolong battery life. Furthermore, the satellite and ground station memory may be utilized to cache large amounts of data, for example, Internet web pages.

Furthermore, some implementations of the satellite communication network implement GPS-based intelligent caching on network satellites and ground stations. The network may be used as an edge-caching device, and content of particular interest to a geographic locale may be cached on network satellites and ground stations based on their geographical locations. For example, service content such as advertisements may be tailored to the area being served. The network satellites may broadcast in different languages over different areas of the Earth.

The approaches, techniques and processes described above can also be combined with each other to present unique, end-to-end solutions for passing data from ground station to ground station, from ground station to satellite or vice versa, or from satellite to satellite. As such, other processes, such as processes that use in whole or part, combine, or improve upon the processes noted above, are also contemplated.

For instance, a computer-implemented process may include receiving, at an origin mobile ground station, data via a network, determining, at the origin mobile ground station, a predicted location of the origin mobile ground station based on a current position, heading and velocity of the origin mobile ground station, and dynamically selecting, at the origin mobile ground station, a first satellite within communication range of the predicted location. The process also includes determining, at the origin mobile ground station, a first radio frequency and a first data transmission rate supported by the first satellite, transmitting, when the origin mobile ground station reaches the predicted location, the data from the origin mobile ground station to the first satellite via the determined first radio frequency and first data transmission rate, and determining, at the origin mobile ground station, when the first satellite will go out of communication range of the origin mobile ground station. Moreover, the process includes transmitting a request from the origin mobile ground station to the first satellite before the first satellite is determined to go out of communication range, the request verifying whether transmitting of the data has been completed, and transmitting, if a response to the request is received verifying that transmitting of the data has not been completed or if no response to the request is received, a flag from the origin mobile ground station to the first satellite, the flag indicating that the data is incomplete.

The process may further include determining, at the first satellite, a first geographical footprint based on a communication capability of the first satellite, the first geographical footprint including the predicted location, determining, at the first satellite, the radio frequency based on the first geographical footprint, monitoring, at the first satellite, the radio frequency, receiving, at the first satellite, the data via the radio frequency, determining, at the first satellite, a destination ground station based on header information included with the data, dynamically selecting, at the first satellite, a second satellite that is or is predicted to be physically closer to the destination ground station than the first satellite, determining, at the first satellite, a transmission medium supported by the first satellite and the second satellite, and transmitting the data from the first satellite to the second satellite via the transmission medium, when the second satellite is expected to be within communication range of the first satellite. Furthermore, the process may include determining, at the second satellite, the destination ground station based on the header information, determining, at the second satellite, when the destination ground station will be within communication range of the second satellite, transmitting the data from the second satellite to the first satellite when the destination ground station is determined to be within communication range of the second satellite, and erasing, at the second satellite, the data.

The process may include determining, at the first satellite, a destination ground station based on header information included with the data, determining, at the first satellite, that the destination ground station is within a first geographical footprint of the first satellite based on a communication capability of the first satellite, determining, at the first satellite, a second radio frequency and a second data transmission rate supported by the destination ground station, and transmitting, when it is determined that the first satellite and the destination ground station are within the first geographical footprint, the data from the first satellite to the destination ground station. The first satellite may be a low earth orbit (LEO) satellite, and may be dynamically selected further based on Internet Protocol (IP) routing and/or ephemeris information of the first satellite. The network may be an Internet network.

If a response to the request is received verifying that transmitting of the data has not been completed or if no response to the request is received, the process may includes determining, at the origin mobile ground station, a second predicted location of the origin mobile ground station, dynamically selecting, at the origin mobile ground station, a second satellite within communication range of the second predicted location, determining, at the origin mobile ground station, a second radio frequency and a second data transmission rate supported by the second satellite, transmitting, when the origin mobile ground station reaches the second predicted location, at least a portion of the data from the origin mobile ground station to the second satellite via the determined second radio frequency and second data transmission rate, determining, at the origin mobile ground station, when the second satellite will go out of communication range of the origin mobile ground station, transmitting a second request from the origin mobile ground station to the second satellite before second satellite is determined to go out of communication range, the request verifying whether transmitting of the at least the portion of the data has been completed, and transmitting, if a second response to the second request is received verifying that transmitting of the at least the portion of the data has not been completed or if no response to the second request is received, a second flag from the origin mobile ground station to the second satellite, the flag indicating that the data is incomplete. The data may be transmitted from the first satellite to a destination ground station without transmitting the data to a second satellite.

The process may include receiving a first portion of the data at the first satellite before the first satellite goes out of communication range of the origin mobile ground station, receiving a second portion of the data at the first satellite after the first satellite goes out of communication range and re-enters the communication range of the origin mobile ground station, combining, at the first satellite, the first and second portions of the data, and transmitting the combined first and second portions of the data to a destination ground station. The process also may include receiving, at the satellite, a duplicate copy of the first or second portions of the data, determining that the duplicate copy is a duplicate of the received first or second portions of the data, and erasing the duplicate copy. The date may be a stream of Internet Protocol (IP) packets.

The process may include transmitting the data from the first satellite to a second satellite based on determining, at the first satellite, that the second satellite is closer to a destination ground station than the first satellite based on ephemeris information of the first and second satellites, transmitting the data from the second satellite to a third satellite based on determining, at the second satellite, that the third satellite is closer to the destination ground station than the second satellite based on ephemeris information of the second and third satellites, transmitting the data from the third satellite to a fourth satellite based on determining, at the third satellite, that the fourth satellite is closer to the destination ground station than the third satellite based on ephemeris information of the third and fourth satellites, and transmitting the data from the fourth satellite to the destination ground station. An indicia of the predicted location may be transmitted to from the origin mobile ground station to the first satellite.

Also, processes may include accessing ephemeris data calculated by an on-board astrodynamics calculator and received from other available network satellites, accessing an on-board Internet routing table describing distance or cost information of the other available network satellites, and determining whether to forward the data to one of the other available network satellites based on the accessed ephemeris data and the on-board Internet routing table. The process may also include accessing availability data describing current and future availability of other network satellites, accessing ephemeris data calculated by an on-board astrodynamics calculator and received from the other available network satellites, accessing an on-board Internet routing table describing distance or cost information of the other available network satellites, accessing a list of currently available ground stations that are not a destination ground station, and determining whether to route the data to an other available network satellite or to an available ground station on the list of currently available ground stations based on the availability data, the ephemeris data, and the on-board Internet routing table.

Furthermore, a computer-implemented process for effecting broadband Internet access from space using a single satellite includes routing Internet data from an origin ground station to a satellite based on predicting that the satellite is within communication range of the origin ground station, storing the Internet data on the satellite until the satellite travels within predicted communication range of the destination ground station, and routing the Internet data to the destination ground station when the satellite is within the predicted communication range.

The arrangements have been described with particular illustrative embodiments. It is to be understood that the concepts and implementations are not however limited to the above-described embodiments and that various changes and modifications may be made.

What is claimed is:

1. A computer-implemented method comprising:
   receiving, at an origin mobile ground station, data via a network, wherein the origin mobile ground station is moving on Earth with a particular heading and velocity;
   determining, at the origin mobile ground station, that the data is to be transmitted to a destination ground station via satellite transmission;
   determining, at the origin mobile ground station, a future time when the data is to be transmitted;
   using a location prediction process executed by the origin mobile ground station, determining, at the origin mobile ground station, a predicted location of the origin mobile ground station at the future time when the data is to be transmitted, based on a current position, heading and velocity of the origin mobile ground station, and predicting a location of satellites in a satellite network at the future time;
   based on determining the predicted location of the origin mobile ground station and the predicted location the satellites at the future time, selecting, at the origin mobile ground station, a first satellite in the satellite network that will be within communication range of the predicted location of the origin mobile ground station at the future time when the data is to be transmitted;
   determining, at the origin mobile ground station, a first radio frequency and a first data transmission rate supported by the first satellite;
   upon the origin mobile ground station reaching the predicted location, establishing communications, using the origin mobile ground station, with the first satellite;
   transmitting the data from the origin mobile ground station to the first satellite via the determined first radio frequency and first data transmission rate;
   determining, at the origin mobile ground station, when the first satellite will go out of communication range of the origin mobile ground station;
   transmitting a request from the origin mobile ground station to the first satellite before the first satellite is determined to go out of communication range, the request asking for verification whether transmission of the data has been completed; and
   transmitting, if a response to the request is received verifying that transmission of the data has not been completed or if no response to the request is received, a flag from the origin mobile ground station to the first satellite, the flag indicating that the data is incomplete.

2. The method of claim 1, wherein the first satellite is a low earth orbit (LEO) satellite.

3. The method of claim 1, wherein the first satellite is dynamically selected based on Internet Protocol (IP) routing.

4. The method of claim 1, wherein the first satellite is dynamically selected based on ephemeris information of the first satellite.

5. The method of claim 1, wherein the network includes an Internet network.

6. The method of claim 1, comprising, if a response to the request is received verifying that transmitting of the data has not been completed or if no response to the request is received:
   determining, at the origin mobile ground station, a second predicted location of the origin mobile ground station;
   based on determining the second predicted location, selecting, at the origin mobile ground station, a second satellite within communication range of the second predicted location;
   determining, at the origin mobile ground station, a second radio frequency and a second data transmission rate supported by the second satellite;
   transmitting, when the origin mobile ground station reaches the second predicted location, at least a portion of the data from the origin mobile ground station to the second satellite via the determined second radio frequency and second data transmission rate;
   determining, at the origin mobile ground station, when the second satellite will go out of communication range of the origin mobile ground station;
   transmitting a second request from the origin mobile ground station to the second satellite before second satellite is determined to go out of communication range, the request intended for verifying whether transmitting of the at least the portion of the data has been completed; and
   transmitting, if a second response to the second request is received verifying that transmitting of the at least the portion of the data has not been completed or if no response to the second request is received, a second flag from the origin mobile ground station to the second satellite, the flag indicating that the data is incomplete.

7. The method of claim 1, wherein the data comprises a stream of Internet Protocol (IP) packets.

8. The method of claim 1, comprising transmitting an indicia of the predicted location from the origin mobile ground station to the first satellite.

9. A method comprising:
   determining, at a first satellite, a first geographical footprint based on a communication capability of the first satellite;
   determining, at the first satellite and based on the first geographical footprint, a radio frequency associated with an origin mobile ground station that is within the first geographical footprint, wherein the origin mobile ground station is moving on Earth with a particular heading and velocity;
monitoring, at the first satellite, the radio frequency;
receiving, at the first satellite, data from the origin mobile ground station via the radio frequency;
determining, at the first satellite, a destination ground station based on information included with the data;
executing an orbit propagation process at the first satellite, the orbit propagation process predicting a future location and communication availability of one or more satellites in a satellite network;
dynamically selecting, at the first satellite, a second satellite in the satellite network that is or is predicted to be physically closer to the destination ground station than the first satellite;
determining, at the first satellite, a transmission medium supported by the first satellite and the second satellite; and
transmitting the data from the first satellite to the second satellite via the transmission medium, when the second satellite is determined to be within communication range of the first satellite.

10. The method of claim 9, further comprising:
receiving, at the second satellite, data from the first satellite;
determining, at the second satellite, the destination ground station based on the information included with the data received from the first satellite;
determining, at the second satellite, when the destination ground station will be within communication range of the second satellite;
transmitting the data from the second satellite to the destination ground station when the destination ground station is determined to be within communication range of the second satellite; and
erasing, at the second satellite, the data.

11. The method of claim 9, further comprising:
determining, at the first satellite, a destination ground station based on header information included with the data;
determining, at the first satellite and based on the first geographical footprint, that the destination ground station is within the first geographical footprint of the first satellite;
determining, at the first satellite, a second radio frequency and a second data transmission rate supported by the destination ground station; and
transmitting, when it is determined that the destination ground station is within the first geographical footprint, the data from the first satellite to the destination ground station via the second radio frequency and the second data transmission rate.

12. The method of claim 9, comprising:
receiving a first portion of the data at the first satellite before the first satellite goes out of communication range of the origin mobile ground station;
receiving a second portion of the data at the first satellite after the first satellite goes out of communication range and re-enters the communication range of the origin mobile ground station;
combining, at the first satellite, the first and second portions of the data; and
transmitting the combined first and second portions of the data to a destination ground station.

13. The method of claim 12, comprising:
receiving, at the satellite, a duplicate copy of the first or second portions of the data;
determining that the duplicate copy is a duplicate of the received first or second portions of the data; and
erasing the duplicate copy.

14. The method of claim 9, comprising:
transmitting the data from the first satellite to a second satellite based on determining, at the first satellite, that the second satellite is closer to a destination ground station than the first satellite based on ephemeris information of the first and second satellites;
transmitting the data from the second satellite to a third satellite based on determining, at the second satellite, that the third satellite is closer to the destination ground station than the second satellite based on ephemeris information of the second and third satellites;
transmitting the data from the third satellite to a fourth satellite based on determining, at the third satellite, that the fourth satellite is closer to the destination ground station than the third satellite based on ephemeris information of the third and fourth satellites; and
transmitting the data from the fourth satellite to the destination ground station.

15. The method of claim 9, comprising:
accessing, using the first satellite, ephemeris data calculated by an on-board astrodynamics calculator and received from other available network satellites;
accessing, using the first satellite, an on-board Internet routing table describing distance or cost information associated with the other available network satellites; and
determining, using the first satellite, whether to forward the data to one of the other available network satellites based on the accessed ephemeris data and the on-board Internet routing table.

16. The method of claim 9, comprising:
accessing, using the first satellite, availability data describing current and future availability of other network satellites;
accessing, using the first satellite, ephemeris data calculated by an on-board astrodynamics calculator and received from the other available network satellites;
accessing, using the first satellite, an on-board Internet routing table describing distance or cost information of the other available network satellites;
accessing, using the first satellite, a list of currently available ground stations that do not include a destination ground station; and
determining, using the first satellite, whether to route the data to another available network satellite or to an available ground station included in the list of currently available ground stations based on the availability data, the ephemeris data, and the on-board Internet routing table.

17. A device comprising:
an interface configured to receive data via a network, wherein the interface is associated with an origin mobile ground station that is moving on Earth with a particular heading and velocity;
a processor configured to:
determine that the data is to be transmitted to a destination ground station via satellite transmissions;
determine a future time when the data is to be transmitted;
using a location prediction process executed by the origin mobile ground station, determine a predicted location of the origin mobile ground station at the future time when the data is to be transmitted based on a current position, heading and velocity of the origin mobile ground station, and predict a location of satellites in a satellite network at the future time;

based on determining the predicted location of the origin mobile ground station and the predicted location the satellites at the future time, select a first satellite that will be within communication range of the predicted location at the future time when the data is to be transmitted;

determine a first radio frequency and a first data transmission rate supported by the first satellite; and determine when the first satellite will go out of communication range of the origin mobile ground station; and a transmitter configured to:

establish communications with the first satellite when the origin mobile ground station reaches the predicted location;

transmit the data to the first satellite via the determined first radio frequency and first data transmission rate;

transmit a request to the first satellite before the first satellite is determined to go out of communication range, the request verifying whether transmission of the data has been completed; and transmit, if a response to the request is received verifying that transmission of the data has not been completed or if no response to the request is received, a flag to the first satellite, the flag indicating that the data is incomplete.

18. A computer program product, tangibly embodied in a non-transitory machine-readable medium, the computer program product comprising instructions that, when read by a machine, operate to cause data processing apparatus to:

receive data via a network at an origin mobile ground station that is moving on Earth with a particular heading and velocity;

determine that the data is to be transmitted to a destination ground station via satellite transmission;

determine a future time when the data is to be transmitted;

using a location prediction process executed by the origin mobile ground station, determine a predicted location of the origin mobile ground station at the future time when the data is to be transmitted based on a current position, heading and velocity of the origin mobile ground station, and predict a location of satellites in a satellite network at the future time;

based on determining the predicted location of the origin mobile ground station and the predicted location the satellites at the future time, select a first satellite that will be within communication range of the predicted location at the future time when the data is to be transmitted;

determine a first radio frequency and a first data transmission rate supported by the first satellite;

establish communications, when the origin mobile ground station reaches the predicted location, with the first satellite;

transmit the data to the first satellite via the determined first radio frequency and first data transmission rate;

determine when the first satellite will go out of communication range of the origin mobile ground station;

transmit a request to the first satellite before the first satellite is determined to go out of communication range, the request verifying whether transmission of the data has been completed; and transmit, if a response to the request is received verifying that transmission of the data has not been completed or if no response to the request is received, a flag to the first satellite, the flag indicating that the data is incomplete.

19. A computer-implemented method for effecting broadband Internet access from space using a single satellite, comprising:

routing Internet data from an origin mobile ground station to a satellite based on predicting future time when the satellite is within communication range of the origin mobile ground station, wherein the origin mobile ground station is moving on Earth with a particular heading and velocity;

storing the Internet data on the satellite until the satellite travels within predicted communication range of a destination ground station; and routing the Internet data to the destination ground station when the satellite is within the predicted communication range of the destination ground station.

20. A device comprising:

an interface configured to receive data via a network;

a processor configured to:

determine, at a first satellite, a first geographical footprint based on a communication capability of the first satellite;

determine, at the first satellite and based on the first geographical footprint, a radio frequency associated with an origin mobile ground station that is within the first geographical footprint, wherein the origin mobile ground station is moving on Earth with a particular heading and velocity;

monitor, at the first satellite, the radio frequency;

receive, at the first satellite, data from the origin mobile ground station via the radio frequency;

determine, at the first satellite, a destination ground station based on information included with the data;

dynamically select, at the first satellite, a second satellite that is or is predicted to be physically closer to the destination ground station than the first satellite; and determine, at the first satellite, a transmission medium supported by the first satellite and the second satellite; and a transmitter configured to:

transmit the data from the first satellite to the second satellite via the transmission medium, when the second satellite is determined to be within communication range of the first satellite.

21. A computer program product, embodied in a non-transitory machine-readable medium, the computer program product comprising instructions that, when read by a machine, operate to cause data processing apparatus to:

determine, at a first satellite, a first geographical footprint based on a communication capability of the first satellite;

determine, at the first satellite and based on the first geographical footprint, a radio frequency associated with an origin mobile ground station that is within the first geographical footprint, wherein the origin mobile ground station is moving on Earth with a particular heading and velocity;

monitor, at the first satellite, the radio frequency;

receive, at the first satellite, data from the origin mobile ground station via the radio frequency;

determine, at the first satellite, a destination ground station based on information included with the data;

dynamically select, at the first satellite, a second satellite that is or is predicted to be physically closer to the destination ground station than the first satellite; and determine, at the first satellite, a transmission medium supported by the first satellite and the second satellite; and transmit the data from the first satellite to the second satellite via the transmission medium, when the second satellite is determined to be within communication range of the first satellite.

* * * * *